United States Patent
George et al.

(10) Patent No.: US 10,652,286 B1
(45) Date of Patent: May 12, 2020

(54) CONSTRAINT BASED COMMUNICATION SESSIONS

(71) Applicant: Amazon Technologies, Inc., Seattle, WA (US)

(72) Inventors: Michael Martin George, Seattle, WA (US); Maria Christine Renz, Seattle, WA (US); Jeffrey P. Bezos, Greater Seattle, WA (US); Gregory Michael Hart, Mercer Island, WA (US); Rohit Prasad, Lexington, MA (US); Brian Oliver, Seattle, WA (US); Jae Pum Park, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 388 days.

(21) Appl. No.: 15/374,907

(22) Filed: Dec. 9, 2016

Related U.S. Application Data

(60) Provisional application No. 62/406,339, filed on Oct. 10, 2016.

(51) Int. Cl.
*H04L 12/24* (2006.01)
*H04L 29/06* (2006.01)
*H04L 29/08* (2006.01)
*H04L 12/58* (2006.01)

(52) U.S. Cl.
CPC .......... *H04L 65/1069* (2013.01); *H04L 51/10* (2013.01); *H04L 65/1086* (2013.01); *H04L 67/143* (2013.01); *H04L 67/18* (2013.01); *H04L 67/26* (2013.01); *H04L 67/303* (2013.01); *H04L 67/306* (2013.01)

(58) Field of Classification Search
CPC . H04L 65/1069; H04L 51/10; H04L 65/1086; H04L 67/143; H04L 67/18; H04L 67/26; H04L 67/303; H04L 67/306
USPC ........................................................ 709/228
See application file for complete search history.

(56) References Cited

U.S. PATENT DOCUMENTS

| 2005/0174951 A1* | 8/2005 | Schrader ................ H04N 7/152 370/260 |
| 2006/0085417 A1* | 4/2006 | John ................. G06F 17/30604 |
| 2012/0042026 A1* | 2/2012 | Park .................... H04L 12/1818 709/206 |

(Continued)

OTHER PUBLICATIONS

"Data Usage—Call Timer—Android Apps on Google Play" pp. 1-4, https://play.google.com/store/apps/details?id=com.gary.NoTePases &referrer=utm_source . . . downloaded from Internet on Dec. 9, 2016.

*Primary Examiner* — Moustafa M Meky
*Assistant Examiner* — Elizabeth Kassa
(74) *Attorney, Agent, or Firm* — Athorus, PLLC

(57) ABSTRACT

Described are systems, methods, and apparatus that enable constraint based communications between two or more devices. For example, a first user of a first device may submit a communication request to establish a communication session with a second user and provide a constraint for that communication session, such as a time-limit (e.g., limit the communication session to five minutes). In such an example, if the second user accepts the communication request with the constraint, a communication session is established and the system monitors the communication session to determine when a condition corresponding to the constraint has been satisfied. When the condition is satisfied, the communication session is terminated by the system.

23 Claims, 19 Drawing Sheets

(56) References Cited

U.S. PATENT DOCUMENTS

2012/0182384 A1* 7/2012 Anderson .......... H04L 12/1827
                                                    348/14.09
2013/0044870 A1* 2/2013 Altberg ................. G06Q 10/10
                                                    379/114.03

* cited by examiner

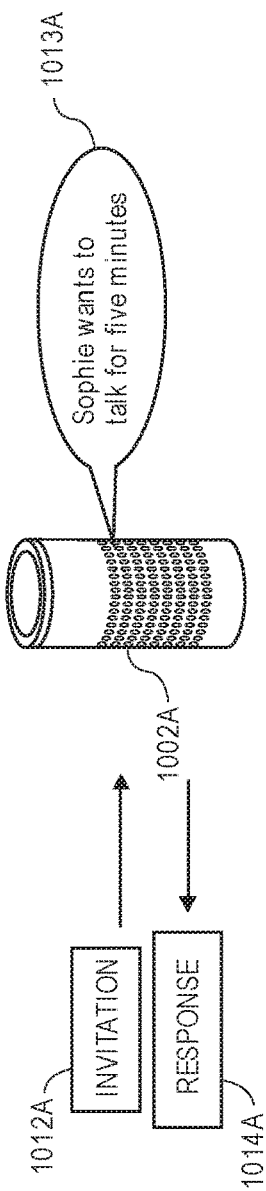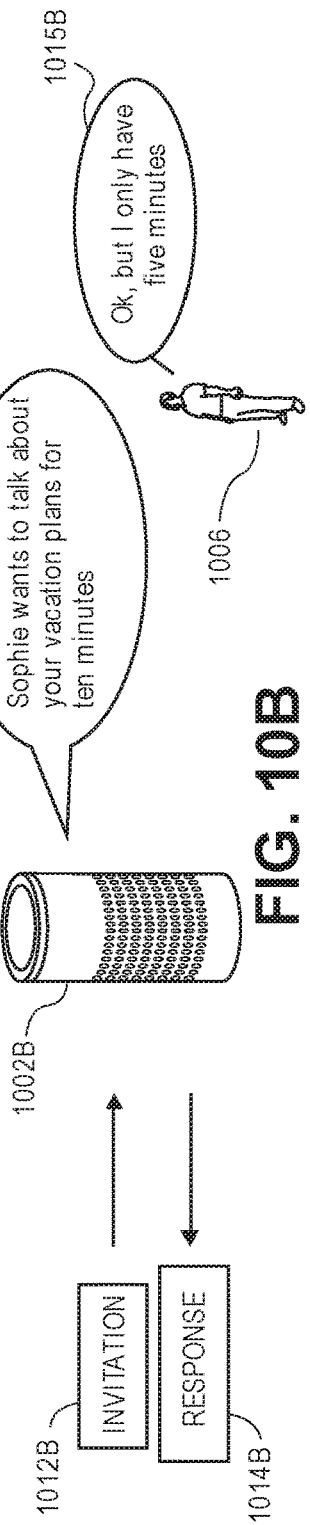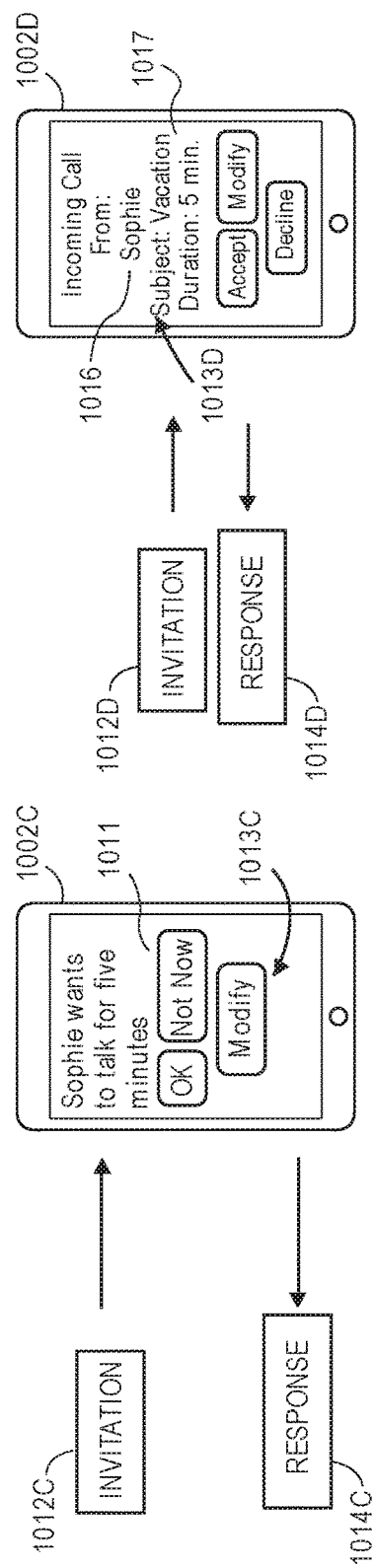

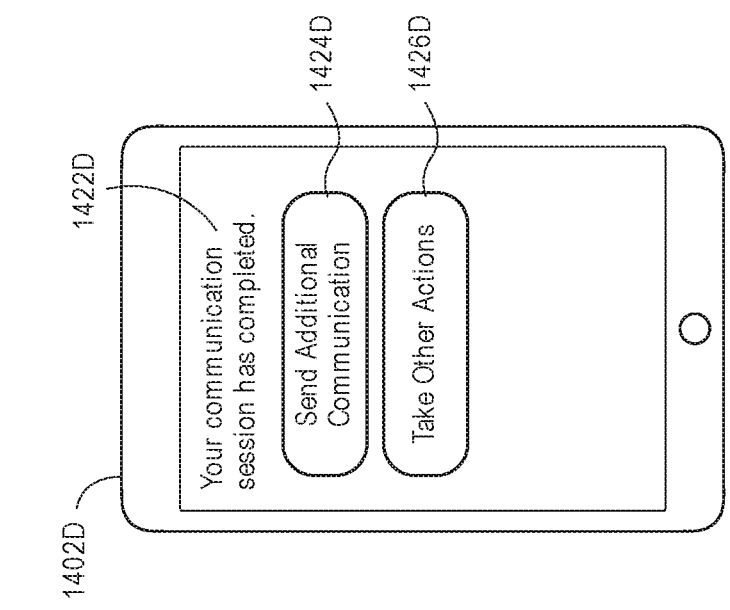
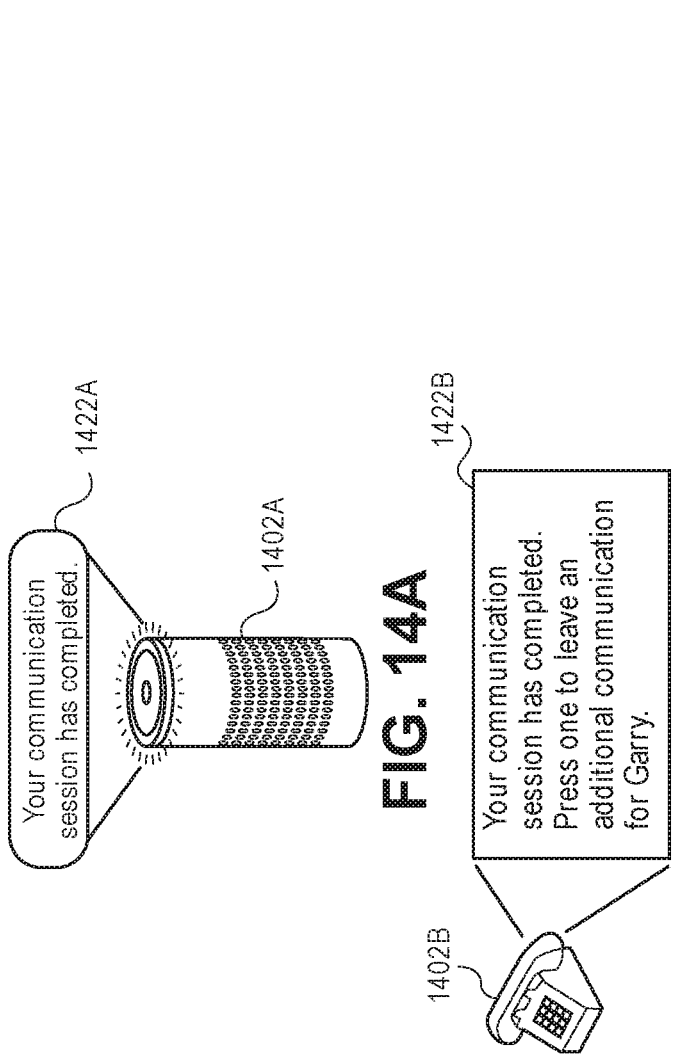
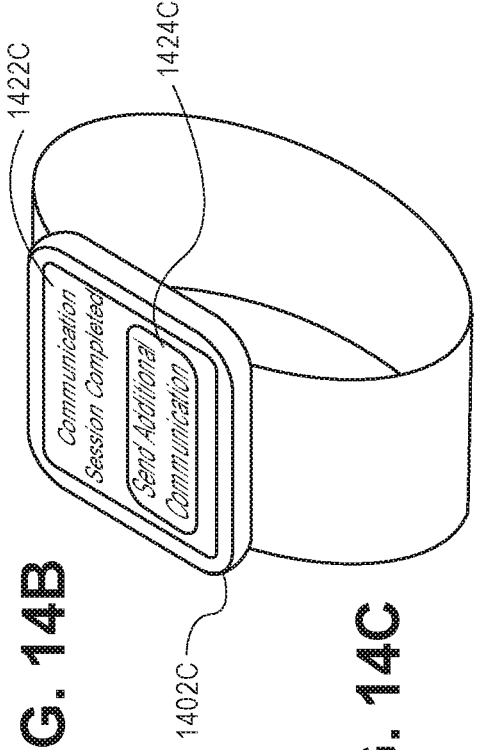
FIG. 14A
FIG. 14B
FIG. 14C
FIG. 14D

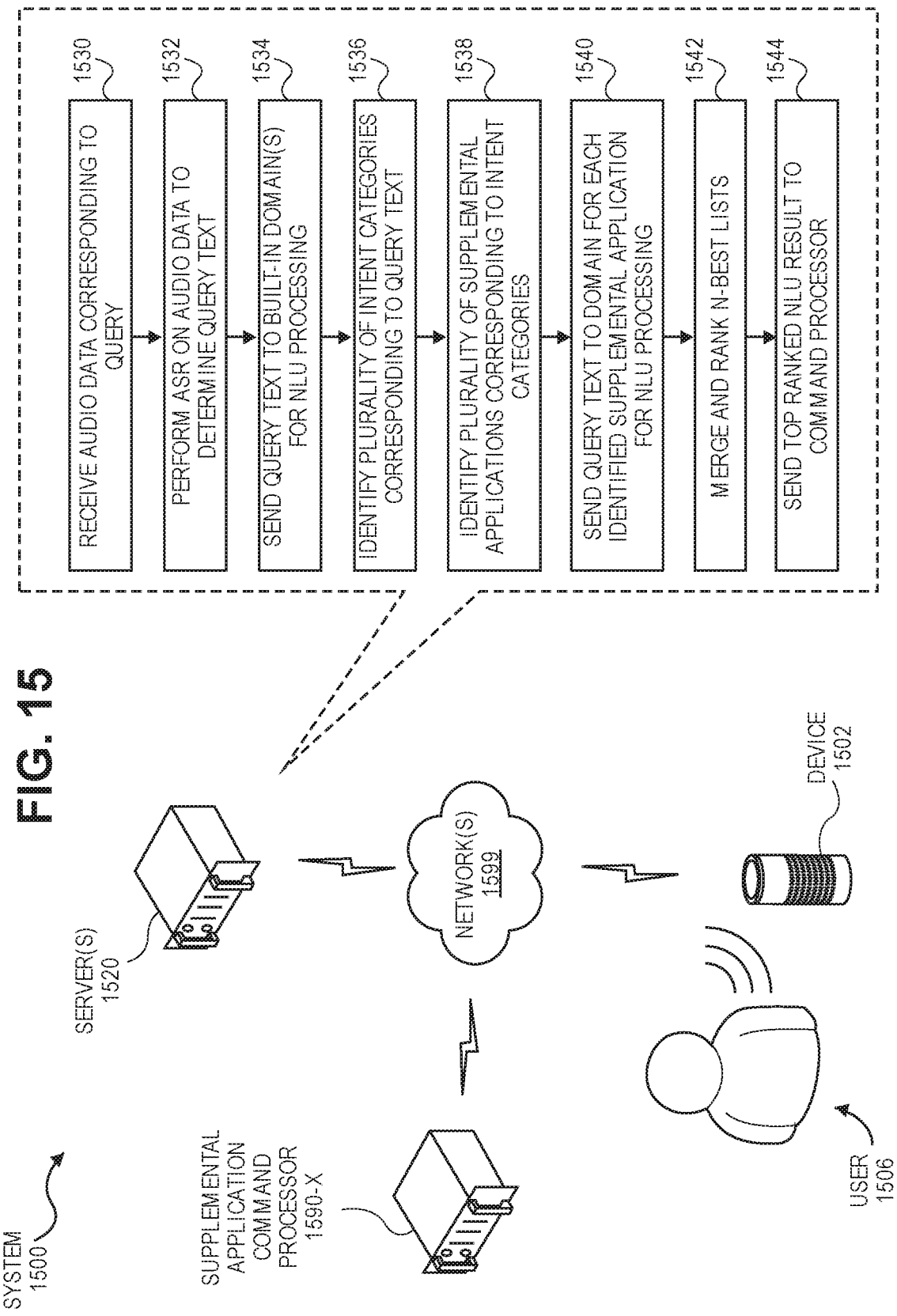

US 10,652,286 B1

CONSTRAINT BASED COMMUNICATION SESSIONS

PRIORITY CLAIM

This application claims priority to U.S. Provisional Patent Application No. 62/406,339, filed Oct. 10, 2016, entitled "Constraint Based Communication Sessions," which is incorporated herein by reference in its entirety.

BACKGROUND

With our constantly evolving society and technology, modes of communicating, preferred modes of communication, and the social responsibilities associated with those modes of communication have likewise evolved. For example, rather than telephone calls as a primary form of remote communication, people often revert to text messaging between portable devices, email communication, or other discrete forms of communication (e.g., instant messaging) where the persons involved in the communication are not in continuous interaction (i.e., each message is separate and discrete). Using these discrete forms of communication, it is generally socially acceptable for there to be a delayed response to a message, or for a party to terminate the communication by simply not responding. In comparison, in continuous modes of communication (e.g., telephone calls, video calls), a user is generally expected to participate in the conversation and respond when a question is presented. Not responding to another user or simply terminating the connection is generally not socially acceptable. As a result, such forms of communication are losing favor. Existing continuous modes of communication (e.g., telephone calls, video communications) do not provide a user with the ability to have personal control over the communication, the subject of the communication, and the duration of the communication without potentially being socially disruptive to the other persons involved in the communication.

BRIEF DESCRIPTION OF DRAWINGS

The detailed description is described with reference to the accompanying figures.

FIGS. 10A-10D illustrate example invitations corresponding to respective constraint based communications, according to an implementation.

FIGS. 14A-14D illustrate example notifications provided as part of a constraint based communication session termination, according to an implementation.

FIG. 15 illustrates a system for establishing a communication session between speech-controlled devices in an automatic speech recognition (ASR) system, according to an implementation.

DETAILED DESCRIPTION

Figure 1:
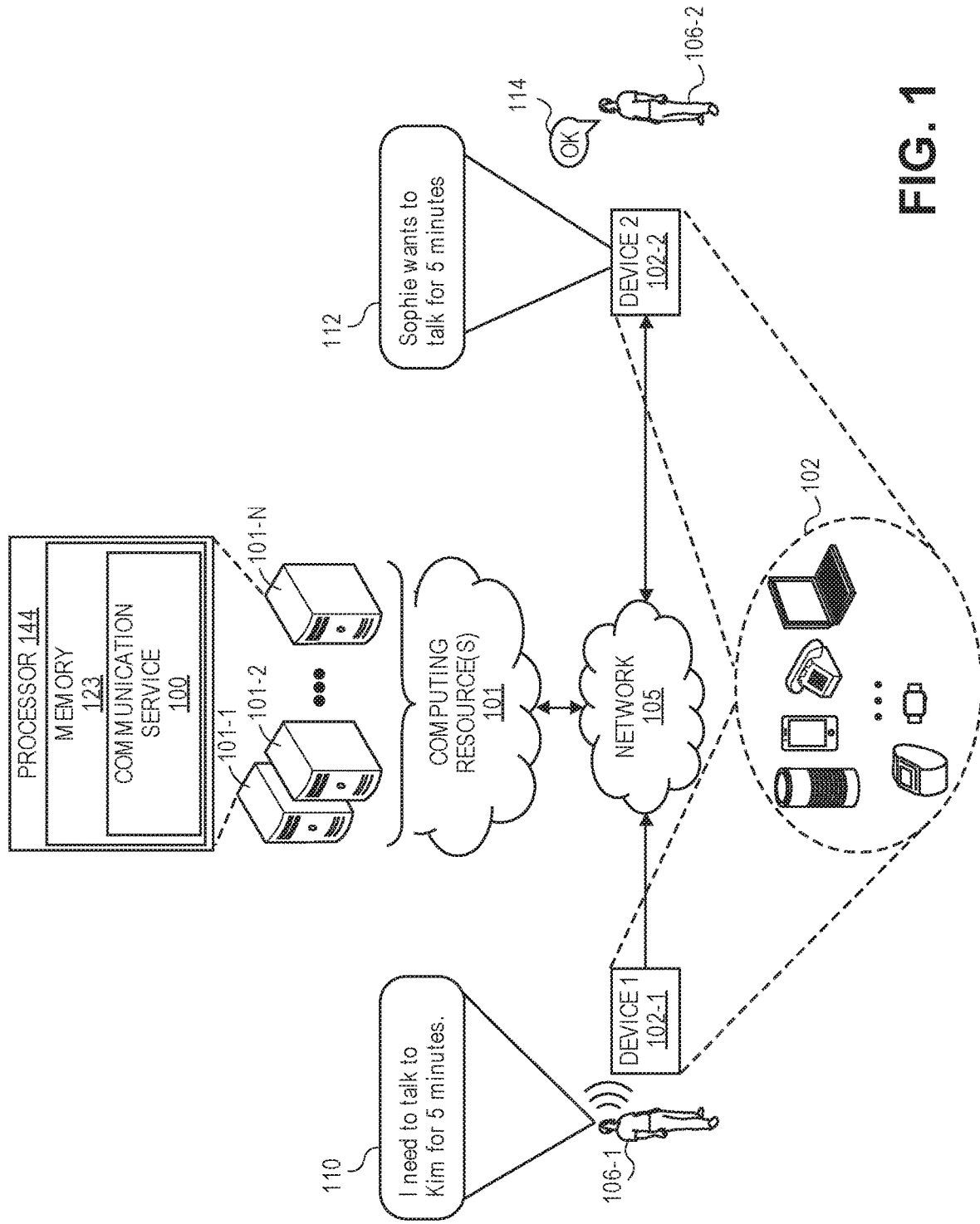
FIG. 1 illustrates an example constraint based communication system, according to an implementation.

Described are systems, methods, and apparatus that enable constraint based communications between two or more devices. For example, a first user of a first device may submit a communication request to establish a communication session with a second user and provide a constraint for that communication session, such as a time-limit (e.g., limit the communication session to five minutes). In such an example, if the second user accepts the communication request, a communication session is established and the system monitors the communication session to determine when one or more conditions corresponding to the constraint have been satisfied. For example, if the constraint is to limit the communication session to five minutes, the condition will be satisfied when the duration of the communication session reaches five minutes. When one or more conditions of one or more constraints have been satisfied, the communication session is terminated by the communication service. In some examples, a notification may be provided to one or both users indicating that the condition corresponding to the constraint has been satisfied and that the communication session is being terminated.

As another example, a second user receiving a communication request from a first user may conditionally accept the communication request, contingent upon a constraint (e.g., time duration) being placed on the communication session. The first user may be informed of the constraint and accept, reject, or further modify the constraint specified by the second user. If the constraint is accepted, the communication session is established and conditions of the constraint associated with the communication session are monitored until one or more of those conditions are satisfied. If the constraint is rejected by the first user, the communication session is not established. If the constraint is further modified, the further modified constraint from the first user is communicated to the second user for acceptance, rejection, or modification. This exchange or negotiation of constraints may continue until an agreement is reached regarding the constraint to be monitored or no agreement is reached and the communication session is not established. In instances where the communication session is established with a constraint, a condition corresponding to the constraint is monitored until satisfied. When the condition corresponding to the constraint is satisfied, the communication session is terminated.

In some implementations, a constraint may be specified by any party to the communication session (e.g., the source of the communication request or the recipient(s) of the communication request). In other implementations, the constraint may be initiated by only the user submitting the communication request. Alternatively, constraints for a communication session may only be specified by recipients of the communication request. Likewise, a constraint based communication session may be a one-to-one communication session, a one-to-many communication session, a many-to-one communication session, or a many-to-many communication session.

A communication session is any form of communication session between two or more devices. For example, a constraint based communication session may be an audio based communication session, a video based communication session, a multi-mode communication session, a data only communication session (e.g., text messaging, short messaging (SMS), multimedia messaging (MMS)), or any other form of communication between devices. In general, a constraint based communication session is any form of communication session that is terminated by the systems described herein upon one or more conditions corresponding to a constraint associated with the communication session being satisfied.

In some implementations, automatic speech recognition (ASR) and/or natural language understanding (NLU) may be used to determine communication requests, constraints, and/or other information from utterances and/or other audible input from users of the system. ASR is a field of computer science, artificial intelligence, and linguistics concerned with transforming audio data associated with speech into text representative of that speech. Similarly, NLU is a field of computer science, artificial intelligence, and linguistics concerned with enabling computers to derive meaning from text input containing natural language. ASR and NLU are often used together as part of a speech processing system.

FIG. 1 illustrates an example constraint based communication session system, according to an implementation. In this example, a first user 106-1 utters a first phrase 110 "I need to talk to Kim for five minutes." The first device 102-1 receives the first phrase and the first phrase is processed to determine information needed to form a communication request and to determine the constraint specified by the first user 106-1 for the communication session. As discussed further below, the first phrase may be processed by the first device 102-1, a communication service 100 operating on one or more remote computing resources 101, or a combination of the first device 102-1 and the communication service 100.

The remote computing resources 101 may form a portion of a network-accessible computing platform implemented as a computing infrastructure of processors, storage, software, data access, and other components that is maintained and accessible via a network 105. Services, such as the communication service 100 offered by the remote computing resources 101, do not require that the user have knowledge of the physical location and configuration of the system that delivers the services. Devices 102, such as the first device 102-1 or the second device 102-2, may communicatively couple to the remote computing resources 101 via the network 105 which may represent wired technologies (e.g., wires, USB, fiber optic cable, etc.), wireless technologies (e.g., RF, cellular, satellite, Bluetooth, etc.), and/or other connection technologies. The network 105 carries data between the devices 102 and the remote computing resources 101 and/or the communication service 100. For example, the network 105 may carry data representative of the first phrase 110 between the first device 102-1 and the computing resources and/or carry data between the first device 102-1, the second device 102-2, and/or the communication service 100 as part of a communication session.

As illustrated, the remote computing resources 101 may include one or more servers, such as servers 101-1, 101-2, . . . , 101-N. These servers 101-1-101-N may be arranged in any number of ways, such as server farms, stacks, and the like that are commonly used in data centers. Furthermore, the servers 101-1-101-N may include one or more processors 144 and memory 123 which may store the communication service 100 and execute one or more of the processes or features discussed herein.

The first device 102-1 may be any type of device that is capable of participating in a communication session. For example, the first device 102-1 may be a cellular phone, smart phone, personal digital assistant, desktop, laptop, wearable computing device, and/or any other form of communication enabled device. In some implementations, the first device may be a client device that includes one or more speakers and one or more microphones. The microphone(s) may be configured to capture sounds (e.g., utterances) from a user speaking and convert those sounds into an audio signal. The audio signal/data may then be sent to a downstream remote device (e.g., remote computing resources 101 and/or communication service 100) for further processing, such as converting the audio signal into an ultimate command (e.g., a communication request and/or constraint). The communication service 100 may then utilize the command to establish a constraint based communication session with a second device. An example device 102 is described in the further detail below with respect to FIG. 17.

For example, the audio signal may be processed to determine a second user 106-2 and/or a second device 102-2 that is to be included in the communication session. In the above example, the first device and/or the communication service 100 may process the first phrase 110 using ASR and/or NLU to determine that the first user 106-1, the source of the communication request, wants to establish a communication session with "Kim," the second user 106-2. Based on the identification of the second user 106-2, the communication service 100 may determine a device 102-2 associated with the second user 106-2. A device 102-2 of the second user 106-2 may be determined based on, for example, a user profile maintained in a memory of the communication service 100. The user profile may identify one or more devices associated with the second user 106-2. If multiple devices are associated with the second user 106-2, a default device for a constraint based communication session may be specified, the communication service 100 may determine a presence of the second user 106-2 with respect to one of the multiple devices, and/or other factors may be considered in determining which device associated with the second user 106-2 is to be used as the device 102-2.

In addition to determining the second user 106-2 and/or the second device 102-2, the audio signal may further be processed to determine a constraint for the communication session specified by the first user 106-1. In this example, the constraint corresponds to a duration of the communication session ("five minutes").

Based on the source of the communication request, the determined second user 106-2 and/or determined second device 102-2, and the determined constraint, the communication service 100 generates and sends an invitation to the second device 102-2. The invitation includes a source of the communication request, in this example, the first user 106-1 ("Sophie"), and the determined constraint (e.g., five minutes) for the requested communication session.

The second device 102-2, which like the first device may be any form of communication capable device, receives the invitation and generates an audible output 112 for the second user 106-2 that notifies the second user that the first user 106-1 ("Sophie") is requesting to establish a communication session and to limit that communication session with a constraint, in this example, a set time duration (five minutes). As discussed further below, the output from the second device may be audible, visual, tactile, and/or other form of output that notifies the second user that the first user is requesting to establish a communication session and to limit that communication session with a constraint.

In other implementations, rather than sending an invitation to the second device 102-2, a communication session may be automatically established between the first device 102-1 and the second device 102-2 and the first phrase 110 from the first user 106-1 may be transmitted to and output by the second device 102-2. In such an example, the first phrase 110 may be output to the second user 106-2 and function as the audible output 112 that notifies the second user that the first user 106-1 is requesting a communication session with a constraint.

Upon receiving the audible output 112, the second user produces a response in the form of an utterance that includes a second phrase 114—"Ok." The second device 102-2 receives the second phrase and the second phrase is processed to determine that the second user 106-2 has accepted the invitation. Similar to the first phrase 110 from the first user 106-1, the second phrase may be processed using ASR and/or NLU to determine the intent of the user. The processing may be done by the second device 102-2, the communication service 100, or a combination of the second device 102-2 and the communication service 100.

In this example, the communication service 100, upon determining that the response from the second user is an acceptance of the constraint based communication request, establishes a communication session between the first device 102-1 and the second device 102-2 and monitors the communication session to determine when one or more conditions corresponding to the constraint have been satisfied. Alternatively, if the communication session is already established, upon determining that the response is an acceptance, the communication session is maintained and monitored to determine when one or more conditions corresponding to the constraint have been satisfied.

As discussed further below, in some implementations, during the communication session, the communication service 100 may provide to one or both of the first device 102-1 or the second device 102-2 one or more constraint notifications. A constraint notification may indicate a constraint relating to the communication session, an amount of time remaining in the communication session before a condition corresponding to the constraint is satisfied, an option to modify the constraint, that a condition has been satisfied and the communication session is being terminated, that a post communication action may be performed, etc. Regardless of the content of the constraint notification, the receiving device may produce an output to present the constraint notification to the user of the device. For example, the first device 102-1 may present an audible output that communicates a received constraint notification to the first user 106-1. Likewise, the second device 102-2 may present a visual output that communicates a received constraint notification to the second user 106-2. The constraint notifications sent to the first device 102-1 and the second device 102-2 may include the same or different content or information.

When the communication service 100 determines that a condition corresponding to the constraint of the communication session has been satisfied, the communication service 100 terminates the communication session between the first device 102-1 and the second device 102-2. In some implementations, the communication service 100 may also provide a notification to one or both of the first device 102-1 and the second device 102-2 that is output by the respective device to inform the user that the condition corresponding to the constraint has been satisfied and the communication session has been terminated by the communication service 100. For example, if the communication session has a constraint of five minutes, when the communication service 100 determines that the duration (condition) of the communication session reaches five minutes, the communication service 100 terminates the communication session and provides a notification to each of the first device 102-1 and the second device 102-2 indicating that the condition was satisfied and the communication session terminated. Each of the first device 102-1 and the second device 102-2 generate a corresponding output to inform the first user 106-1 and the second user 106-2, respectively, that the condition corresponding to the constraint was satisfied and the communication session terminated.

Figure 2:
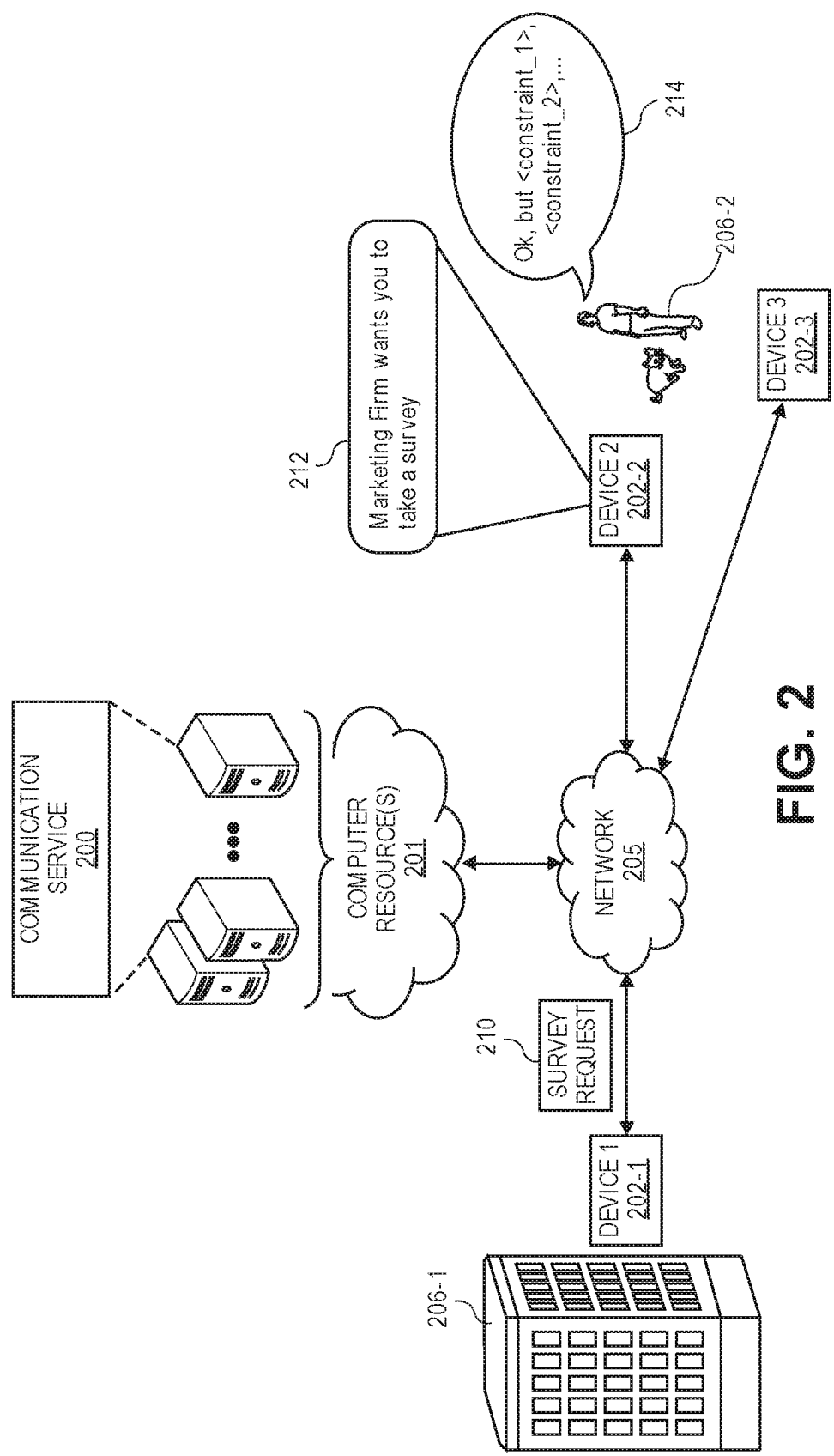
FIG. 2 illustrates another example constraint based communication system, according to an implementation.

FIG. 2 illustrates another example constraint based communication session system, according to an implementation. In this example, the first user 206-1 is a business entity that utilizes a first device 202-1 to generate a communication request 210, in this example, a survey request. In this example, the communication request does not include a constraint.

The first device 202-1 may be, for example, an automated computing device that generates communication requests and, if a communication session is established from the communication request, the communication session may be performed by the computing device or may be transferred to another device so that a human user or other entity associated with the business can participate in the communication session.

The communication service 200, operating on the computing resources 201 receives via the network 205 the communication request 210 and processes the communication request 210 to determine a source of the communication request, any constraints associated with the communication request, and to determine the second user 206-2 and/or the second device 202-2 to which an invitation corresponding to the communication request is to be sent. In this example, the communication request may be transmitted from the first user 206-1 to the communication service via the network 205 in the form of data arranged according to a defined application programming interface (API) that specifies the source, recipient, subject of the communication request (e.g., survey), etc. Other forms of data transmission and/or data structure may likewise be utilized.

The communication service 200, upon receiving the communication request 210, processes the request and generates an invitation that is transmitted to the second device 202-2. For example, based on the source of the communication request and the determined second user 206-2 and/or determined second device 202-2, the communication service 200 generates and sends an invitation to the second device 202-2. The invitation includes an indication of a source of the communication request, in this example, the business entity. As discussed further below, in some implementations, the invitation may also include other information corresponding to the communication request. For example, the invitation may specify a subject or topic (e.g., survey, work, travel, vacation) for the requested communication session if provided by the source of the communication request, or otherwise determinable. For example, in some implementations, the communication service 200 may maintain a list of entities, such as user 206-1 that generally initiate communication sessions for a particular purpose (e.g., marketing, surveys).

The second device 202-2 receives the invitation and generates an output, such as an audible output 212 for the second user 206-2 that notifies the second user that the first user 206-1 ("Marketing Firm") is requesting to establish a communication session. In this example, the output also provides a topic ("survey") that informs the second user 206-2 as to the intent or subject corresponding to the requested communication session.

In this example, upon receiving the audible output 212, the second user produces an utterance 214 that includes an acceptance, "Ok," and one or more constraints that are a condition of the acceptance. In the FIG. 2 illustration, the constraints are represented as <constraint 1>, <constraint 2>, etc. The constraints may be any form or type of constraint for the communication session. For example, the second user may place a time duration constraint, a cost constraint, a point accumulation constraint, etc. In one example, the second user 206-2 may provide a conditional acceptance in the form of "Ok, but I'll only participate in the survey for ten minutes and it will cost Marketing Firm $1.00 per minute." As will be appreciated, any type and/or number of constraints may be included with a conditional acceptance.

The second phrase may be processed using ASR and/or NLU to determine the intent of the user. The processing may be done by the second device 202-2, the communication service 200, or a combination of the second device 202-2 and the communication service 200. In this example, the communication service 200, upon determining that the second user has provided a conditional acceptance with one or more constraints, sends data back to the first device 202-1 indicating the conditional acceptance and the constraints specified by the second user 206-2. The transmission of the data back to the first device 202-1, presentation of the conditional acceptance to the first user 206-1 and the acceptance, or further conditional acceptance and constraints by the first user 206-1 may be performed in a manner similar to delivery and acceptance or conditional acceptance of the invitation that is sent to the second user 206-2.

For example, the communication service 200 may transmit to the first device 202-1 data that indicates the conditional acceptance of the second user 206-2 and the constraint(s) specified by the second user that are to be monitored for the communication session if the communication session is established. The first device 202-1 receives the data from the communication service 200 and generates an output to the first user 206-1 and the first user 206-1 may accept the constraints specified by the second user, conditionally accept and specify still further constraints, or reject the constraints specified by the second user. If the first user accepts the constraints specified by the second user 206-2, the communication service 200 establishes a communication session. If the first user conditionally accepts and provides still further constraints, the exchange of constraints continues and the additional constraints are transmitted back to the second user. The process of conditional acceptance and further constraints may continue until an agreement is reached between the users and a communication session established or, if one of the users rejects the constraints, a communication session is not established.

In some implementations, one or both users may specify a device and/or device type for use in a communication session and the specified device may be different than the device utilized to accept and/or constrain the communication request. For example, the second user may conditionally accept the communication request and include one or more constraints for the communication session. In addition, the second user 206-2 may specify a device, such as a third device 202-3 that is to be utilized in the communication session. If the communication session is established, the communication service 200 will establish the communication session between the first device 202-1 (or another device specified by the first user 206-1) and the third device 202-3.

As discussed further below, in some implementations, during the communication session, the communication service 200 may provide to one or more of the first device 202-1, the second device 202-2, and/or the third device 202-3, one or more constraint notifications. The receiving device may produce an output to present the constraint notification to the user of the device. For example, the first device 202-1 may present an audible output that communicates a received constraint notification to the first user 206-1. Likewise, the second device 202-2 may present a visual output that communicates a received constraint notification to the second user 206-2. The constraint notifications sent to the first device 202-1 and the second device 202-2 may include the same or different content or information.

In some implementations, the communication service 200 may send one or more constraint notifications to a device that is not included in the communication session. For example, a communication session may be established between the first device 202-1 and the second device 202-2 and the communication service 200 may send a constraint notification to the third device 202-3, which may or may not be included in the communication session. For example, a user may specify, as part of a communication session request, communication session response, and/or as a user preference, that constraint notifications are to be sent to the third device 202-3.

When the communication service 200 determines that a condition corresponding to the constraint of the communication session has been satisfied, the communication service 200 terminates the communication session. In some implementations, the communication service 200 may also provide a notification to one or more of the first device 202-1, the second device 202-2, and/or the third device 202-3 that is presented by the respective device to inform the user that the condition corresponding to the constraint has been satisfied and the communication session has been terminated by the communication service 200. For example, if the communication session has a constraint of five minutes, when the communication service 200 determines that the duration (condition) of the communication session reaches five minutes, the communication service 200 terminates the communication session and provides a notification to one or more of the first device 202-1, the second device 202-2, and/or the third device 202-3 indicating that the condition was satisfied and the communication session terminated. The device(s) that receive the notification generate a corresponding output to inform the first user 206-1 and/or the second user 206-2 that the condition corresponding to the constraint was satisfied and the communication session terminated.

Figure 3:
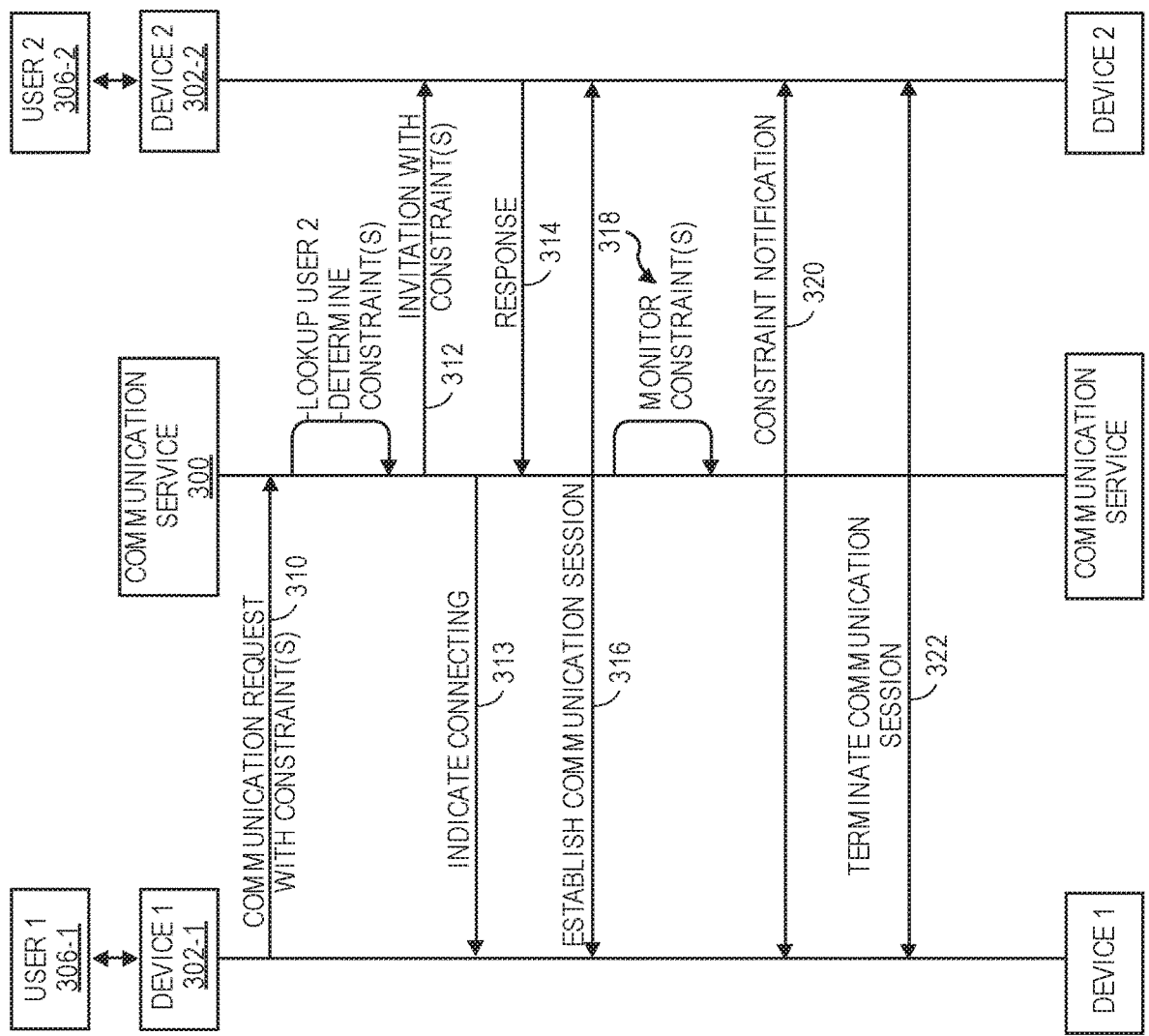
FIGS. 3-6 illustrate example messaging exchanges as part of various constraint based communication sessions, according to various implementations.

FIGS. 3-6 illustrate example messaging exchanges as part of various constraint based communication sessions, according to various implementations. FIG. 3 illustrates a messaging exchange for a constraint based communication in which the first user 306-1, using the first device 302-1 sends a communication request 310 that includes one or more constraints that are to be monitored for a communication session established in response to the communication request. The communication request 310 may be in the form of data that is transmitted from the first device 302-1 to the communication service 300 and may include one or more of a source of the communication request (e.g., an identification of the first device 302-1 and/or an identification of the first user 306-1), an indication of the intended recipient of the communication request (e.g., the second user 306-2 and/or the second device 302-2), and an indication of the constraint to be monitored for a communication session between the source of the communication request and the recipient. In some implementations, the recipient of the communication request may not be a specific user or a specific device but may instead be a group of one or more users, a group of one of more devices, a group of one or more types of users (e.g., experts on a particular topic, members of a business organization department, members of a club or organization), a group of one or more types of devices (e.g., audio enabled device, video enabled device, touch enabled device, tactile enabled device), and/or any combination thereof.

Likewise, in some implementations, any number and/or types of constraints may be specified with the communication request 310. For example, a constraint may be a time duration, a time of day, a day of week, a time of year, an availability of the recipient, a location of the recipient, a capability of a device to be used in the communication session, a price for participating in the communication session, etc. In some implementations, other information may likewise be included in the communication request. For example, the communication request may also include a subject or topic for the communication session, whether the communication session will be recorded, etc.

The communication service 300, upon receiving the communication request 310 with one or more constraints processes the communication request to determine an intended recipient and to determine the one or more constraints specified by the first user 306-1. For example, the communication service 300 may utilize ASR and/or NLU to process an audible signal representative of a communication request. Alternatively, if the communication request is transmitted as structured data, the structured data may be arranged according to an agreed upon API.

In some implementations, the communication request may include an identifier for the second device 302-2 that is used to determine the intended recipient. As another example, the communication request may identify a user (e.g., Kim) that is known to the first user 306-1. In such an example, the communication service 300 may maintain in a data store information about users known to the first user and utilize that information to determine a device (the second device) associated with a user known to the first user 306-1 and identified in the communication request. For example, if the first user sends a communication request that identifies a user named "Kim" as the intended recipient, the communication service 300 may determine a user identified as Kim in the data store that is associated with the first user 306-1.

Upon identifying the intended recipient, in this example the second user 306-2, a device, such as the second device 302-2, is determined. In some implementations, the data store may identify one or more devices and/or device identifiers associated with the second user 306-2. In some implementations, a default device may be specified for the second user. In other implementations, the device(s) associated with the second user may periodically provide status information to the communication service indicating a presence, absence, availability, and/or other information relating to the second user as perceived by the device(s). Based on the received information, one or more devices may be determined for the second user. For example, if the user has three associated devices, device A, device B, and device C, each of which periodically provide status information about the user, the communication service may select from the three devices based on the received status information. As an example, if device A identifies the second user 306-2 as away, device B identifies the second user 306-2 as available, and device C identifies the second user 306-2 as away, the communication service 300 may select device B as the second device 302-2.

Upon determining the recipient (the second user 306-2), the second device 302-2, and the constraint(s), the communication service 300 sends an invitation 312 with constraint(s). The invitation with constraints may be transmitted in the form of data (e.g., structured data) from the communication service 300 to the second device 302-2.

In addition to sending the invitation 312 to the second device 302-2, the communication service 300 may send indicate connecting data 313 to the first device to indicate to the first device that the invitation has been transmitted to the second device 302-2. The indicate connecting data 313 may be in the form of a communication request, invitation acknowledgement, or any other form of information to indicate to the first device 302-1 that the invitation has been sent to the second device. In some examples, the indicate connecting data may provide additional details corresponding to the invitation. For example, if the communication service 300 determines and sends the invitation 312 to a specific device of the second user 306-2, the indicate connecting data 313 may provide information back to the first device indicating the second device 302-2, the capabilities of the second device 302-2, a type of the second device 302-2, a location of the second device 302-2, a status of the second user 306-2, etc.

The second device 302-2, upon receiving the invitation, prepares and presents an output to the second user 306-2 that informs the second user 306-2 of the invitation to participate in the communication session and the constraints specified for the communication session. For example, the second device 302-2 may generate an audible, visual, tactile, and/or other form of output that presents the information to the second user 306-2 about the source of the communication request and the constraint(s) specified by the first user 306-1.

In this example, the second user 306-2 provides an input back to the second device 302-2 in the form of an acceptance and the second device 302-2 sends response data 314 to the communication service 300 indicating an acceptance of the invitation 312. The response data 314 may be any form of data (e.g., structured data) that indicates to the communication service a response from the user, in this example, an acceptance of the communication request. As discussed further below, in some implementations, the response data 314 may specify device types and/or capabilities corresponding to the second device 302-2 and/or specify a different device to be used in the communication session.

The communication service 300, upon receiving the response data 314 that indicates an acceptance, establishes a communication session 316 between the first device 302-1 and the second device 302-2. The communication session may be any form of communication data exchange between the first device and the second device. Likewise, the communication session and/or the data exchanged between the first device 302-1 and the second device 302-2 may be monitored 318 by the communication service 300 to determine if one or more conditions associated with the specified constraint(s) have been satisfied. For example, if the constraint is a time duration, the communication session may be monitored to determine when the duration of the communication session satisfies a condition of the constraint (e.g., the amount of the time duration).

Each time the communication service determines that a condition corresponding to the constraint has been satisfied, and/or at periodic times during the communication session, the communication service 300 may send constraint notification data 320 to one or both of the first device 302-1 or the second device 302-2. The constraint notification data 320 includes information relating to the communication session. For example, the constraint notification may indicate the constraint, progress toward a condition associated with the constraint, an option to modify the constraint(s), and/or other information relating to the constraint and/or the communication session. Example constraint notifications are discussed in further detail below.

Finally, when a condition corresponding to the constraint(s) specified for the communication session are satisfied, the communication session is terminated 322 by the communication service 300. In one example, the communication service 300 may send termination data to the first device 302-1 and/or the second device 302-2 that causes the first device and/or the second device to terminate the communication session. The communication service may also send a notification to the first device 302-1 and/or the second device 302-2 indicating that the condition corresponding to the constraint has been satisfied and the communication session is being terminated. Such a notification may be presented by the first device 302-1 and/or the second device 302-2 to provide information to the first user 306-1 and/or the second user 306-2.

The notification sent to the first device 302-1 may be the same or different than the notification sent to the second device 302-2. For example, the first notification sent to the first device 302-1 may include data indicating that the constraint specified for the communication session has been satisfied and provide the first user 306-1 with an option to modify the constraint. The notification sent to the second device 302-2 may include data indicating that the constraint specified by the first user for the communication session has been satisfied and provide the second user 306-2 with an option to perform one or more post communication action. As discussed further below, a post communication action may be, for example, to leave a message or recording for the first user, to schedule another meeting, to initiate another constraint based communication, etc.

Figure 4:
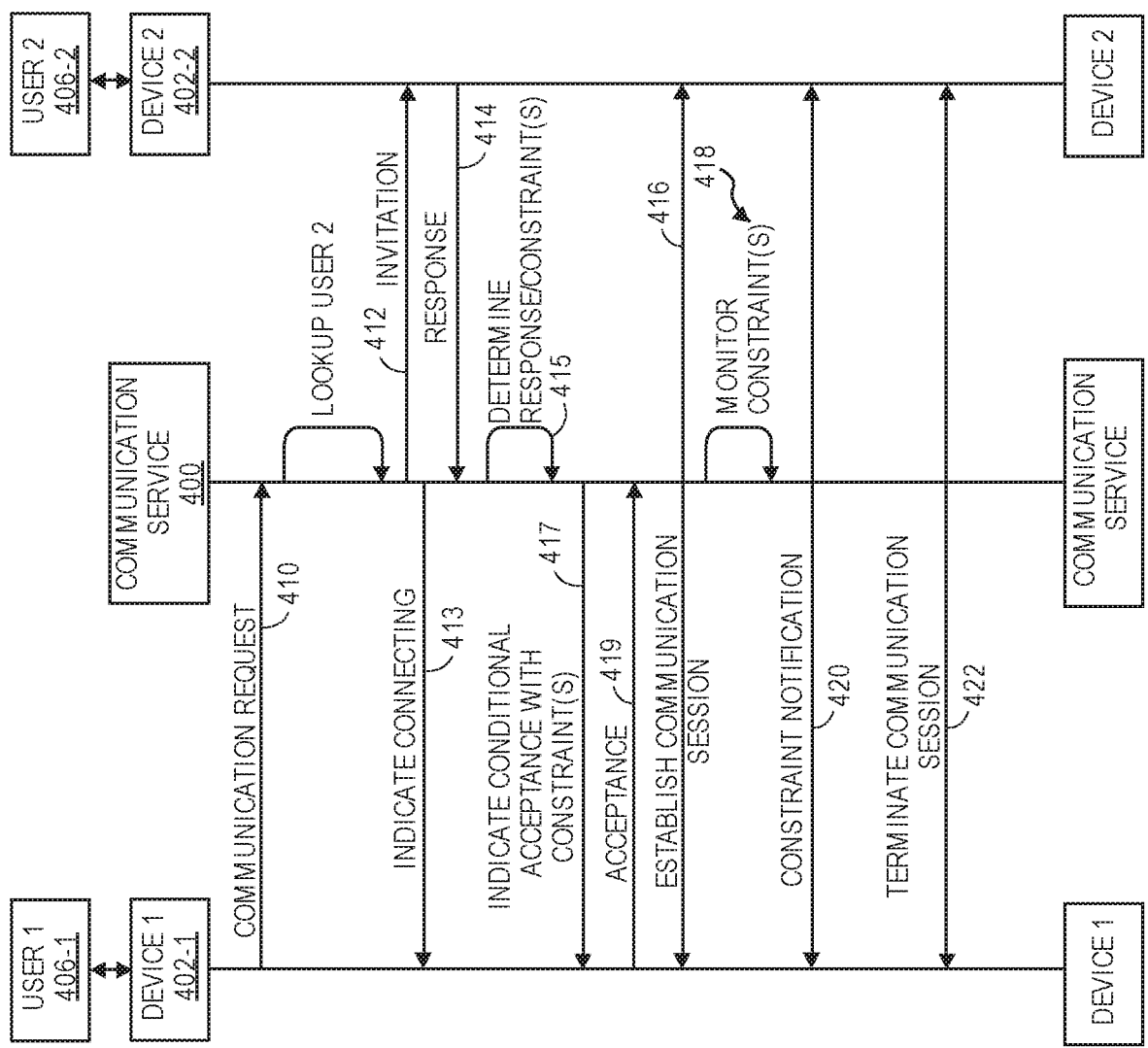

FIG. 4 illustrates a messaging exchange for a constraint based communication session in which the first user 406-1, using the first device 402-1 sends a communication request 410 that does not include a constraint. The communication request 410 may be in the form of data that is transmitted from the first device 402-1 to the communication service 400 and may include one or more of a source of the communication request (e.g., an identification of the first device 402-1 and/or an identification of the first user 406-1) and an indication of the intended recipient of the communication request (e.g., the second user 406-2 and/or the second device 402-2). In some implementations, the recipient of the communication request may not be a specific user or a specific device but may instead be a group of one or more users, a group of one of more devices, a group of one or more types of users (e.g., experts on a particular topic, members of a business organization department, members of a club or organization), a group of one or more types of devices (e.g., audio enabled device, video enabled device, touch enabled device, tactile enabled device), and/or any combination thereof.

In addition to the source of the communication request and the intended recipient, in some implementations, other information may likewise be included in the communication request 410. For example, the communication request 410 may also include a subject or topic for the communication session, whether the communication session will be recorded, etc.

The communication service 400, upon receiving the communication request 410, processes the communication request to determine an intended recipient. For example, the communication service may utilize ASR and/or NLU to process an audible signal representative of a communication request. Alternatively, if the communication request is transmitted as structured data, the structured data may be arranged according to an agreed upon API.

In some implementations, the communication request may include an identifier for the second device 402-2 that is used to determine the intended recipient. As another example, the communication request may identify a second user 406-2 (e.g., Kim) that is known to the first user 406-1. In such an example, the communication service 400 may maintain in a data store information about users known to the first user and utilize that information to determine a device (the second device) associated with a second user 406-2 known to the first user 406-1 and identified in the communication request. For example, if the first user sends a communication request that identifies a user named "Kim" as the intended recipient, the communication service may determine a user identified as Kim in the data store that is associated with the first user 406-1.

Upon identifying the intended recipient, in this example the second user 406-2, a device, such as the second device 402-2, is determined. In some implementations, the data store may identify one or more devices and/or device identifiers associated with the second user 406-2. In some implementations, a default device may be specified for the second user. In other implementations, the device associated with the second user may periodically provide status information to the communication service indicating a presence, absence, availability, and/or other information relating to the second user as perceived by the device. Based on the received information, one or more devices may be determined for the second user. For example, if the second user 406-2 has three associated devices, device A, device B, and device C, each of which periodically provide status information about the user, the communication service may select from the three devices based on the received status information. As an example, if device A identifies the second user 406-2 as away, device B identifies the second user 406-2 as available, and device C identifies the second user as away, the communication service 400 may select device B as the second device 402-2.

Upon determining the recipient (the second user 406-2) and the second device 402-2, the communication service 400 sends an invitation 412. In contrast to the example discussed above with respect to FIG. 3, in this example, the invitation 412 does not include any constraints. The invitation may be transmitted in the form of data (e.g., structured data) from the communication service 400 to the second device 402-2.

In addition to sending the invitation 412 to the second device 402-2, the communication service 400 may send indicate connecting data 413 to the first device to indicate to the first device that the invitation has been transmitted to the second device 402-2. The indicate connecting data 413 may be in the form of a communication request, invitation acknowledgement, or any other form of information to indicate to the first device 402-1 that the invitation has been sent to the second device. In some examples, the indicate connecting data may provide additional details corresponding to the invitation. For example, if the communication service 400 determines and sends the invitation to a specific device of the second user 406-2, the indicate connecting data 413 may provide information back to the first device indicating the second device 402-2, the capabilities of the second device 402-2, a type of the second device 402-2, a location of the second device 402-2, a status of the user, etc.

The second device 402-2, upon receiving the invitation, prepares and presents an output to the second user 406-2 that informs the second user 406-2 of the invitation to participate in the communication session. For example, the second device 402-2 may generate an audible, visual, tactile, and/or other form of output that presents the information to the second user 406-2 about the source of the communication request.

In this example, the second user 406-2 provides an input back to the second device 402-2 in the form of a conditional acceptance that includes one or more constraints specified by the second user 406-2 that are to be monitored for the communication session. The second device 402-2 sends response data 414 to the communication service 400 indicating the conditional acceptance and specified constraints. The response data 414 may be any form of data (e.g., structured data) that indicates to the communication service a conditional acceptance of the communication request and constraints to be monitored for the communication session. As discussed further below, in some implementations, the response data 414, in addition to indicating a conditional acceptance and one or more constraints, may specify device types and/or capabilities corresponding to the second device 402-2 and/or specify a different device to be used in the communication session.

The communication service 400, upon receiving the response data 414, processes 415 the response data 414 to determine if the response data indicates an acceptance, a conditional acceptance with one or more constraints, or a rejection. For example, the communication service 400 may utilize ASR and/or NLU to process 415 the response data 414. Alternatively, if the response data is received in a structured data format, the structured data may be processed to determine whether the response data indicates an acceptance, conditional acceptance, or a rejection.

In this example, processing of the response data determines that the response data indicates a conditional acceptance and one or more constraints. The communication service 400, upon determining the conditional acceptance and one or more constraints, sends data 417 to the first device 402-1 indicating the conditional acceptance and the constraints specified by the second user 406-2 for the communication session. The first device 402-1, upon receiving the data 417 from the communication service 400, presents the conditional acceptance and condition(s) to the first user and the first user has the option to accept the constraints, specify other constraints, and/or reject the conditional acceptance with the specified constraints. In this example, the first user 406-1 provides an acceptance 419 that is sent by the first device 402-1 in the form of acceptance data 419 indicating acceptance of the constraints specified by the second user 406-2 for the communication session to the communication service 400.

The communication service 400, upon receiving the acceptance data 419, establishes a communication session 416 between the first device 402-1 and the second device 402-2. The communication session may be any form of communication data exchange between the first device and the second device. Likewise, the communication session and/or the data exchanged between the first device 402-1 and the second device 402-2 may be monitored 418 by the communication service 400 to determine if one or more conditions associated with the specified constraint(s) have been satisfied. For example, if the constraint is a time duration, the communication session may be monitored to determine when the duration of the communication session satisfies a condition of the constraint (e.g., the amount of the time duration).

Each time the communication service determines that a condition corresponding to the constraint has been satisfied, and/or at periodic times during the communication session, the communication service 400 may send constraint notification data 420 to one or both of the first device 402-1 or the second device 402-2. The constraint notification data 420 indicates information relating to the communication session. For example, the constraint notification may indicate the constraint, progress toward a condition associated with the constraint, an option to modify the constraint(s), and/or other information relating to the constraint and/or the communication session. Example constraint notifications are discussed in further detail below.

Finally, when a condition corresponding to the constraint(s) specified for the communication session is satisfied, the communication session is terminated 422 by the communication service. In one example, the communication service 400 may send termination data to the first device 402-1 and/or the second device 402-2 that causes the first device and/or the second device to terminate the communication session. In some implementations, the communication service may also send a notification to the first device 402-1 and/or the second device 402-2 indicating that the condition corresponding to the constraint has been satisfied and the communication session is being terminated. Such a notification may be output by the first device 402-1 and/or the second device 402-2 to provide information to the first user 406-1 and/or the second user 406-2.

The notification sent to the first device 402-1 may be the same or different than the notification sent to the second device 402-2. For example, the first notification sent to the first device 402-1 may include data indicating that the constraint specified for the communication session has been satisfied and the communication is being terminated. The notification sent to the second device 402-2 may include data indicating that the specified constraint has been satisfied and provide the second user 406-2 with an option to extend or modify the constraint and maintain the communication session.

Figure 5:
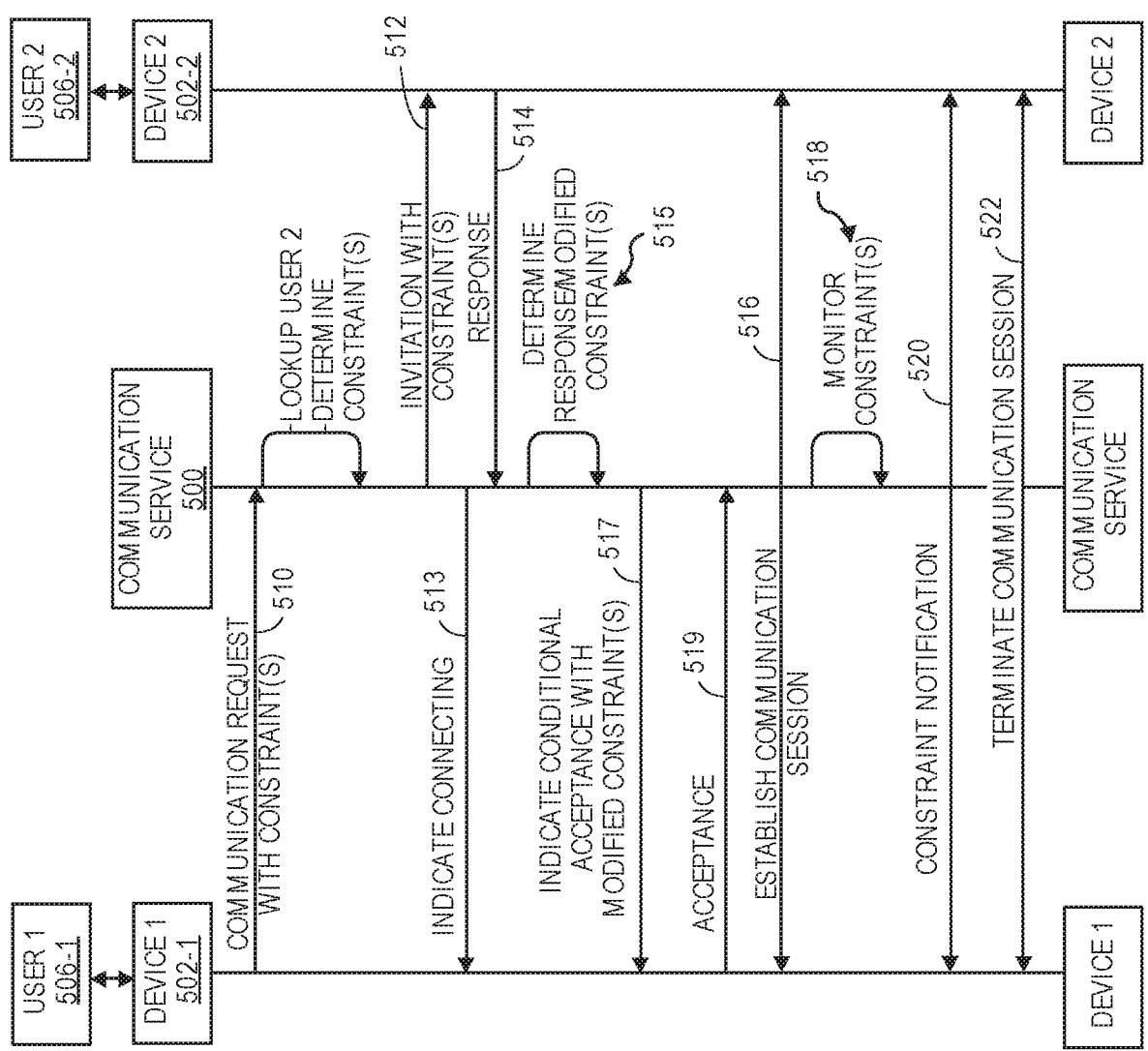

FIG. 5 illustrates a messaging exchange for a constraint based communication session in which the first user 506-1, using the first device 502-1, sends a communication request 510 that includes one or more constraints that are to be monitored for a communication session established in response to the communication request 510. The communication request 510 may be in the form of data that is transmitted from the first device 502-1 to the communication service 500 and may include one or more of a source of the communication request (e.g., an identification of the first device 502-1 and/or an identification of the first user 506-1), an indication of the intended recipient of the communication request (e.g., the second user 506-2 and/or the second device 502-2), and an indication of the constraint(s) to be monitored for a communication session between the source of the communication request and the recipient. In some implementations, the recipient of the communication request may not be a specific user or a specific device but may instead be a group of one or more users, a group of one of more devices, a group of one or more types of users (e.g., experts on a particular topic, members of a business organization department, members of a club or organization), a group of one or more types of devices (e.g., audio enabled device, video enabled device, touch enabled device, tactile enabled device), and/or any combination thereof.

Likewise, in some implementations, any number and/or types of constraints may be specified with the communication request 510. For example, a constraint may be a time duration, a time of day, a day of the week, a time of year, an availability of the recipient, a location of the recipient, a capability of a device to be used in the communication session, a price for participating in the communication session, etc. In some implementations, other information may likewise be included in the communication request. For example, the communication request may also include a subject or topic for the communication session, whether the communication session will be recorded, etc.

The communication service 500, upon receiving the communication request 510 with one or more constraints, processes the communication request to determine an intended recipient and to determine the one or more constraints specified by the first user 506-1. For example, the communication service may utilize ASR and/or NLU to process an audible signal representative of a communication request. Alternatively, if the communication request is transmitted as structured data, the structured data may be arranged according to an agreed upon API.

In some implementations, the communication request may include an identifier for the second device 502-2 that is used to determine the intended recipient. As another example, the communication request may identify a second user 506-2 (e.g., Kim) that is known to the first user 506-1. In such an example, the communication service 500 may maintain in a data store information about users known to the first user and utilize that information to determine a device (the second device) associated with a second user 506-2 known to the first user 506-1 and identified in the communication request. For example, if the first user sends a communication request that identifies a user named "Kim" as the intended recipient, the communication service may determine a user identified as Kim in the data store that is associated with the first user 506-1.

Upon identifying the intended recipient, in this example the second user 506-2, a device, such as the second device 502-2 is determined. In some implementations, the data store may identify one or more devices and/or device identifiers associated with the second user 506-2. In some implementations, a default device may be specified for the second user. In other implementations, the device associated with the second user may periodically provide status information to the communication service indicating a presence, absence, availability, and/or other information relating to the second user as perceived by the device. Based on the received information, one or more devices may be determined for the second user. For example, if the user has three associated devices, device A, device B, and device C, each of which periodically provide status information about the user, the communication service may select from the three devices based on the received status information. As an example, if device A identifies the second user 506-2 as away, device B identifies the second user 506-2 as available, and device C identifies the second user as away, the communication service 500 may select device B as the second device 502-2.

Upon determining the recipient (the second user 506-2), the second device 502-2, and the constraint(s), the communication service 500 sends an invitation 512 with constraint(s). The invitation with constraints may be transmitted in the form of data (e.g., structured data) from the communication service 500 to the second device 502-2.

In addition to sending the invitation 512 to the second device 502-2, the communication service 500 may send indicate connecting data 513 to the first device to indicate to the first device that the invitation has been transmitted to the second device 502-2. The indicate connecting data 513 may be in the form of a communication request, invitation acknowledgement, or any other form of information to indicate to the first device 502-1 that the invitation has been sent to the second device. In some examples, the indicate connecting data may provide additional details corresponding to the invitation. For example, if the communication service 500 determines and sends the invitation to a specific device of the second user 506-2, the indicate connecting data 513 may provide information back to the first device indicating the second device 502-2, the capabilities of the second device 502-2, a type of the second device 502-2, a location of the second device 502-2, a status of the user, etc.

The second device 502-2, upon receiving the invitation with the one or more constraints, prepares and presents an output to the second user 506-2 that informs the second user 506-2 of the invitation to participate in the communication session and the constraints specified by the first user for the communication session. For example, the second device 502-2 may generate an audible, visual, tactile, and/or other form of output that presents the information to the second user 506-2 about the source of the communication request and the one or more constraints.

In this example, the second user 506-2 provides an input back to the second device 502-2 in the form of a conditional acceptance that includes one or more constraints specified by the second user 506-2 that are to be monitored for the communication session. The conditions specified by the second user may be in addition to or instead of the constraints specified by the first user 506-1. For example, the first user may include a constraint of ten minutes as part of the communication request. The second user, in conditionally accepting the request, may specify a constraint of five minutes. In such an example, the constraint specified by the second user 506-2 is more restrictive than the constraint specified by the first user 506-1.

In other examples, the constraints may co-exist for the communication session. For example, the first user may provide a time constraint (e.g., five minutes) and the second user may specify a location based constraint (e.g., while I am in my home). In such an example, both constraints may be monitored for the communication session and, if a condition for either constraint is satisfied, the communication session may be terminated. For example, if the time duration exceeds five minutes or the second user leaves their home, a condition is determined to be satisfied and the communication service terminates the communication session.

As discussed further below, the communication service 500 may specify one or more owners of each constraint that is monitored for a communication session and only the owner of the communication session may be allowed to modify the constraint. In instances where multiple constraints have been specified for a communication session, the constraints may have different owners.

Returning to FIG. 5, the second device 502-2, upon receiving the conditional acceptance and constraints from the second user 506-2, sends response data 514 to the communication service 500 indicating the conditional acceptance and specified constraints. The response data 514 may be any form of data (e.g., structured data) that indicates to the communication service a conditional acceptance of the communication request and constraints to be monitored for the communication session, as specified by the second user. As discussed further below, in some implementations, the response data 514, in addition to indicating a conditional acceptance and one or more constraints, may specify device types and/or capabilities corresponding to the second device 502-2 and/or specify a different device to be used in the communication session.

The communication service 500, upon receiving the response data 514, processes 515 the response data 514 to determine if the response data indicates an acceptance, a conditional acceptance with one or more constraints, or a rejection. For example, the communication service 500 may utilize ASR and/or NLU to process 515 the response data 514. Alternatively, if the response data is received in a structured data format, the structured data may be processed to determine whether the response data indicates an acceptance, conditional acceptance, or a rejection.

In this example, processing of the response data determines that the response data indicates a conditional acceptance and one or more constraints. The communication service 500, upon determining that the response data 514 indicates a conditional acceptance and constraint, sends data 517 to the first device 502-1 indicating the conditional acceptance and the constraints specified by the second user 506-2 for the communication session. The first device, upon receiving the data 517 from the communication service 500, presents the conditional acceptance and additional condition(s) specified by the second user 506-2 to the first user 506-1 and the first user has the option to accept the constraints, specify still other constraints, and/or reject the conditional acceptance with the specified constraints. In this example, the first user 506-1 provides an acceptance 519 that is sent by the first device 502-1 in the form of acceptance data indicating acceptance of the constraints specified by the second user 506-2 for the communication session to the communication service 500.

The communication service 500, upon receiving the acceptance, establishes a communication session 516 between the first device 502-1 and the second device 502-2. The communication session may be any form of communication data exchange between the first device and the second device. Likewise, the communication session and/or the data exchanged between the first device 502-1 and the second device 502-2 may be monitored 518 by the communication service 500 to determine if one or more conditions associated with the specified constraint(s) have been satisfied. For example, if the constraint is a time duration, the communication session may be monitored to determine when the duration of the communication session satisfies a condition of the constraint (e.g., the amount of the time duration).

Each time the communication service determines that a condition corresponding to the constraint has been satisfied, and/or at periodic times during the communication session, the communication service 500 may send constraint notification data 520 to one or both of the first device 502-1 or the second device 502-2. The constraint notification data 520 indicates information relating to the communication session. For example, the constraint notification may indicate the constraint, progress toward a condition associated with the constraint, an option to modify the constraint(s), and/or other information relating to the constraint and/or the communication session. Example constraint notifications are discussed in further detail below.

Finally, when a condition corresponding to the constraint(s) specified for the communication session are satisfied, the communication session is terminated 522 by the communication service. In one example, the communication service 500 may send termination data to the first device 502-1 and/or the second device 502-2 that causes the first device and/or the second device to terminate the communication session. In some implementations, the communication service may also send a notification to the first device 502-1 and/or the second device 502-2 indicating that the condition corresponding to the constraint has been satisfied and the communication session is being terminated. Such a notification may be output by the first device 502-1 and/or the second device 502-2 to provide information to the first user 506-1 and/or the second user 506-2.

The notification sent to the first device 502-1 may be the same or different than the notification sent to the second device 502-2. For example, the first notification sent to the first device 502-1 may include data indicating that the constraint specified for the communication session has been satisfied and the communication is being terminated. The notification sent to the second device 502-2 may include data indicating that the specified constraint has been satisfied and provide the second user 506-2 with an option to extend or modify the constraint and maintain the communication session.

While the examples discussed above with respect to FIGS. 3-5 describe sending an invitation request and receiving an acceptance, a conditional acceptance, or negotiating an acceptance prior to establishing a communication session, in some implementation, a communication session may be automatically established between devices upon receipt of the communication request, independent of whether the request includes a constraint. For example, users may specify a preference to allow other users to establish a communication session with their device as if the devices were in constant communication or had a continuous communication session established. In some implementations, a first user device associated with a first user may maintain or monitor status information (e.g., away, present, available, busy, do-not-disturb) of the first user and provide the status information to the communication service. If a second user requests to establish a communication session with that first user, the communication service determines the device associated with the first user and the status of the first user. If the first user has a status of available, present, or other similar status, a communication session is automatically established between the first device and a device of the second user so that the users can begin communicating as if the devices were already connected.

Figure 6:
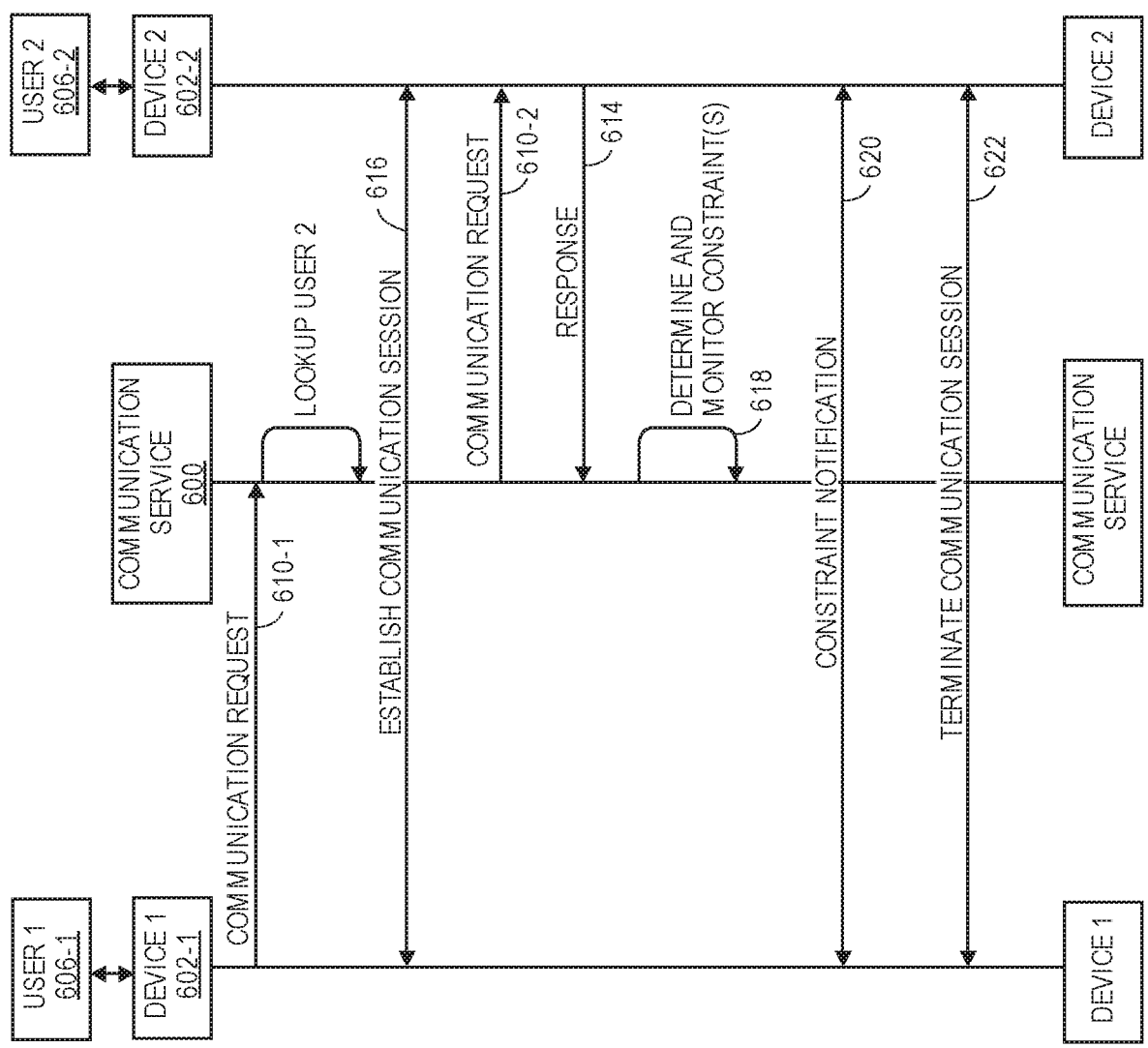

FIG. 6 illustrates a messaging exchange for a constraint based communication session in which the first user 606-1, using the first device 602-1 sends a communication request 610-1 to a second user, according to an implementation. In this example, the second user 606-2 has specified to the communication service 600, that a communication session may be automatically established with the second device 602-2. In some implementations, the second user 606-2 may specify that the communication session may only be automatically established when one or more conditions are satisfied. Communication establishment conditions include, but are not limited to, a status of the second user 606-2, a time of day, a day of week, a constraint being included with the communication request, the communication request being received from an approved user or other user associated with or known to the second user 606-2, etc.

In this example, the first user 606-1 and the second user 606-2 are known to one another and at least the second user has specified to the communication service 600 that a communication session between devices associated with the first user 606-1 and the second user 606-2 may be automatically established in response to a communication request received from a device associated with the first user 606-1.

The communication request 610-1 may be in the form of data that is transmitted from the first device 602-1 to the communication service 600 and may include one or more of a source of the communication request (e.g., an identification of the first device 602-1 and/or an identification of the first user 606-1), and an indication of the intended recipient of the communication request (e.g., the second user 606-2 and/or the second device 602-2). The communication request 610-1 may or may not include a constraint to be monitored for a communication session between the source of the communication request and the recipient. For example, like FIGS. 3 and 5, the communication request may include a constraint for the communication session. In other examples, similar to FIG. 4, the communication request may not include a constraint. In this example, the communication request is in the form of a spoken utterance from the first user of the phrase "Kim, do you have five minutes to talk?"

The communication service 600, upon receiving the communication request 610-1 processes the communication request to determine an intended recipient. For example, the communication service 600 may utilize ASR and/or NLU to process an audible signal representative of a communication request. As discussed above, the phrase from the user may be processed using ASR and/or NLU to determine the intended recipient ("Kim") and any constraints ("five minutes"). Alternatively, if the communication request is transmitted as structured data, the structured data may be arranged according to an agreed upon API.

In some implementations, the communication request may include an identifier for the second device 602-2 that is used to determine the intended recipient. As another example, the communication request may identify a user (e.g., Kim) that is known to the first user 606-1. In such an example, the communication service 600 may maintain in a data store information about users known to the first user and utilize that information to determine a device (the second device) associated with a user known to the first user 606-1 and identified in the communication request. For example, if the first user sends a communication request that identifies a user named "Kim" as the intended recipient, the communication service 600 may determine a user identified as Kim in the data store that is associated with the first user 606-1.

Upon identifying the intended recipient, in this example the second user 606-2, a device, such as the second device 602-2, is determined. In some implementations, the data store may identify one or more devices and/or device identifiers associated with the second user 606-2. In some implementations, a default device may be specified for the second user. In other implementations, the device(s) associated with the second user may periodically provide status information to the communication service indicating a presence, absence, availability, and/or other status information relating to the second user as perceived by the device(s).

Based on the received information, one or more devices may be determined for the second user. For example, if the user has three associated devices, device A, device B, and device C, each of which periodically provide status information about the user, the communication service may select from the three devices based on the received status information. As an example, if device A identifies the second user 606-2 as away, device B identifies the second user 606-2 as available, and device C identifies the second user 606-2 as away, the communication service 600 may select device B as the second device 602-2.

In addition to determining the recipient and the second device 602-2, the communication service also determines that a communication session is to be automatically established between a device of the second user and a device of the first user when a communication request 610-1 is received from a device of the first user. For example, the second user 606-2 may provide a preference to the communication service 600 indicating that a communication session is to be automatically established when a communication request is received from a device associated with the first user 606-1 (or it is otherwise determined that the communication request is from the first user 606-1) and the second user has a status that satisfies a defined condition, such as available or present.

Upon determining the recipient (the second user 606-2), the second device 602-2, and that a communication session is to be automatically established between the first device 602-1 and the second device 602-2, the communication service 600 establishes a communication session 616 between the first device 602-1 and the second device 602-2. The communication session may be any form of communication data exchange between the first device and the second device. The communication session may be established without any further input from the first user 606-1 and/or the second user 606-2 such that it may appear to the first user and/or the second user as if the communication session between the first device 602-1 and the second device 602-2 was already active or ongoing.

Upon establishing the communication session 616, the communication request 610-2 is sent to the second device 602-2. For example, the first phrase may be sent to the second device 602-2 and output by the second device 602-2. In other examples, the communication request 610-2 may be sent to the second device in other forms. The second device 602-2, upon receiving the communication request 610-2, prepares and presents the communication request 610-2 to the second user 606-2. For example, the first phrase provided by the first user 606-1 ("Kim, do you have five minutes to talk?") may be audibly output by the second device 602-2 to the second user 606-2.

In this example, the second user 606-2 provides an input back to the second device 602-2 in the form of an acceptance and the second device 602-2 sends response data 614 to the communication service 600 indicating an acceptance of the invitation. The response data 614 may be any form of data (e.g., structured data) that indicates to the communication service a response from the user, in this example, an acceptance of the communication request. In some implementations, the response data 614 may be separate from the communication session and include an affirmative acceptance by the second user 606-2, such as the user selecting a control on the second device 602-2. In other implementations, the response and corresponding response data 614 may be part of the communication session. For example, the second user may respond by providing an audible output in the form a phrase that is in response to the communication request. In the present example, the second user 606-2 may respond with a phrase, such as "Sure, what's up?", which is in direct response to the communication request 610-2. Like the first phrase, the communication service 600 receives and processes the response data. For example, the communication service may process the response data using ASR and/or NLU to determine whether the response data includes an acceptance, a conditional acceptance, one or more constraints, or a rejection.

In this example, the response data, which includes the phrase from the second user 606-2 ("Sure, what's up?"), is processed using ASR and/or NLU to determine that the response data includes an acceptance ("Sure"). Like the examples discussed above with respect to FIGS. 4 and 5, the response may include one or more additional and/or alternative conditions for the communication session. For example, the second user 606-2 may respond with a conditional acceptance that includes an additional constraint (e.g., "Sure, but I don't want to talk about work."). Such additional constraints may be negotiated and agreed to by the users as part of the communication session and establishment of a constraint based communication session.

Because a communication session is already established between the first device 602-1 and the second device 602-2, the communication service 600 may monitor the communications between the first user 606-1 and the second user 606-2 to determine the conditions for the communication session as specified and agreed to between the first user 606-1 and the second user 606-2. Likewise, even after conditions for the communication session are initially established, the communication service 600 may continue to monitor 618 the communication session and/or the data exchanged between the first device 602-1 and the second device 602-2 to determine if one or more conditions associated with the specified constraint(s) have been satisfied, to determine if one or more constraints of a condition are to be modified, and/or to determine if one or more additional constraints are specified for the communication session. For example, if the constraint is a time duration, the communication session may be monitored to determine when the duration of the communication session satisfies a condition of the constraint (e.g., the amount of the time duration).

Each time the communication service determines that a condition corresponding to the constraint has been satisfied, and/or at periodic times during the communication session, the communication service 600 may send constraint notification data 620 to one or both of the first device 602-1 or the second device 602-2. The constraint notification data 620 includes information relating to the communication session. For example, the constraint notification may indicate the constraint, progress toward a condition associated with the constraint, an option to modify the constraint(s), and/or other information relating to the constraint and/or the communication session. Example constraint notifications are discussed in further detail below.

Finally, when a condition corresponding to the constraint(s) specified for the communication session is satisfied, the communication session is terminated 622 by the communication service 600. In one example, the communication service 600 may send termination data to the first device 602-1 and/or the second device 602-2 that causes the first device and/or the second device to terminate the communication session. The communication service may also send a notification to the first device 602-1 and/or the second device 602-2 indicating that the condition corresponding to the constraint has been satisfied and the communication session is being terminated. Such a notification may be presented by the first device 602-1 and/or the second device 602-2 to provide information to the first user 606-1 and/or the second user 606-2.

The notification sent to the first device 602-1 may be the same or different than the notification sent to the second device 602-2. For example, the first notification sent to the first device 602-1 may include data indicating that the constraint specified for the communication session has been satisfied and provide the first user 606-1 with an option to modify the constraint. The notification sent to the second device 602-2 may include data indicating that the constraint specified by the first user for the communication session has been satisfied and provide the second user 606-2 with an option to perform one or more post communication actions. As discussed further below, a post communication action may be, for example, to leave a message or recording for the first user, to schedule another meeting, to initiate another constraint based communication, etc.

Figure 7:
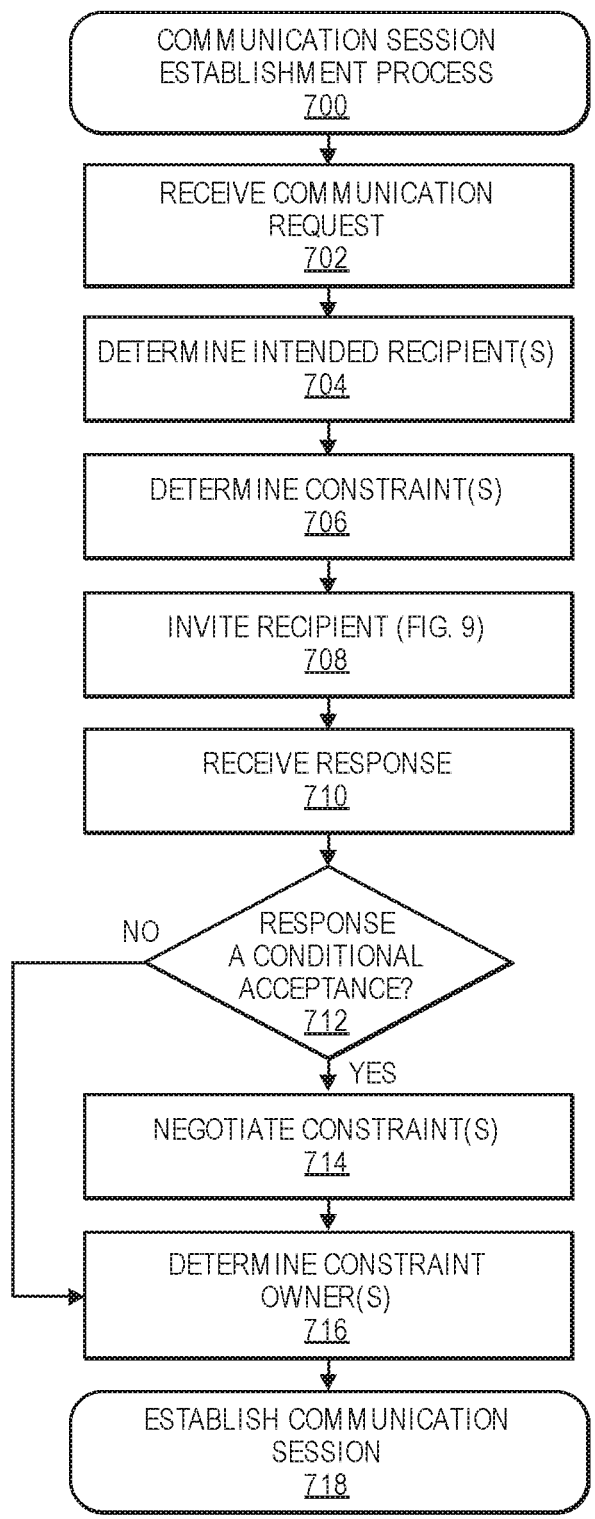
FIG. 7 illustrates an example constraint based communication session establishment process, according to an implementation.

FIG. 7 illustrates an example constraint based communication session establishment process, according to an implementation. The process of FIG. 7 and each of the other processes and sub-processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 700 initiates upon receipt of a communication request, as in 702. As discussed above, a communication request may include, for example, one or more of, an indication of a source of the communication request, an indication of an intended recipient of the communication request, one or more constraints, a subject or topic corresponding to the communication request, etc. The communication request may be received as a signal representative of a phrase uttered by a user (e.g., digital audio data representative of a user's utterance), output from ASR processing of a spoken phrase, structured data that includes the information (e.g., indication of the source of the communication request, intended recipient of the communication request), etc.

Figure 8A:
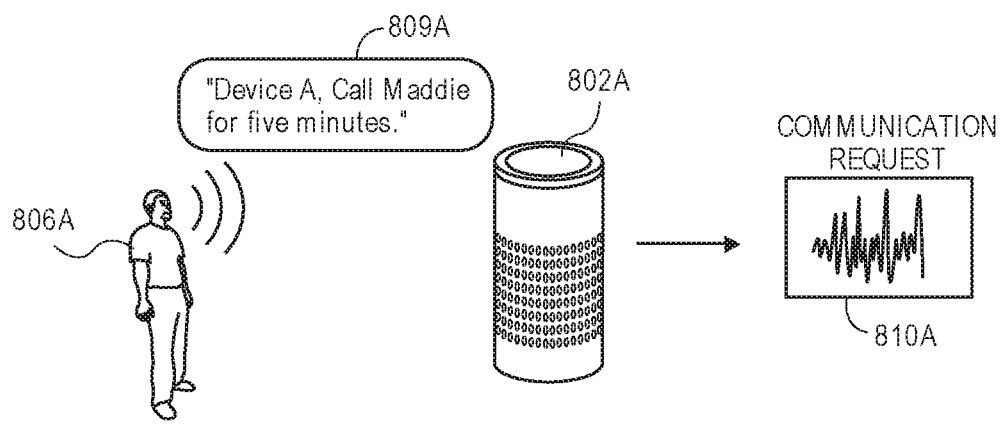
FIGS. 8A-8B illustrate examples for establishing a constraint based communication session, according to an implementation.

For example, referring to FIG. 8A, illustrated is a user 806A audibly outputting a phrase 809A, "Device A, Call Maddie for five minutes." The output phrase is received by one or more microphones and/or other forms of audio input component(s) of a device 802A. In some implementations, the device 802A may transmit or send a communication request 810A as digital audio data that is processed by the example process 700. In other examples, the device 802A may initially process the phrase 809A using, for example, ASR and NLU, to determine if the phrase includes one or more wakewords (e.g., "Device A" or "Call"). As discussed below with respect to FIGS. 15-16, if a wakeword is detected, the phrase may be further processed by the client or transmitted to the example process 700, which may be operating as part of the communication service on a remote computing resource, for further processing. Regardless of whether the phrase may be processed by the device 802A or the communication service operating on a remote device, the phrase is processed using, for example, ASR and NLU, to determine that the phrase is a communication request. Additional discussion regarding processing of a phrase using ASR and NLU is provided below with respect to FIGS. 15-16.

Figure 8B:
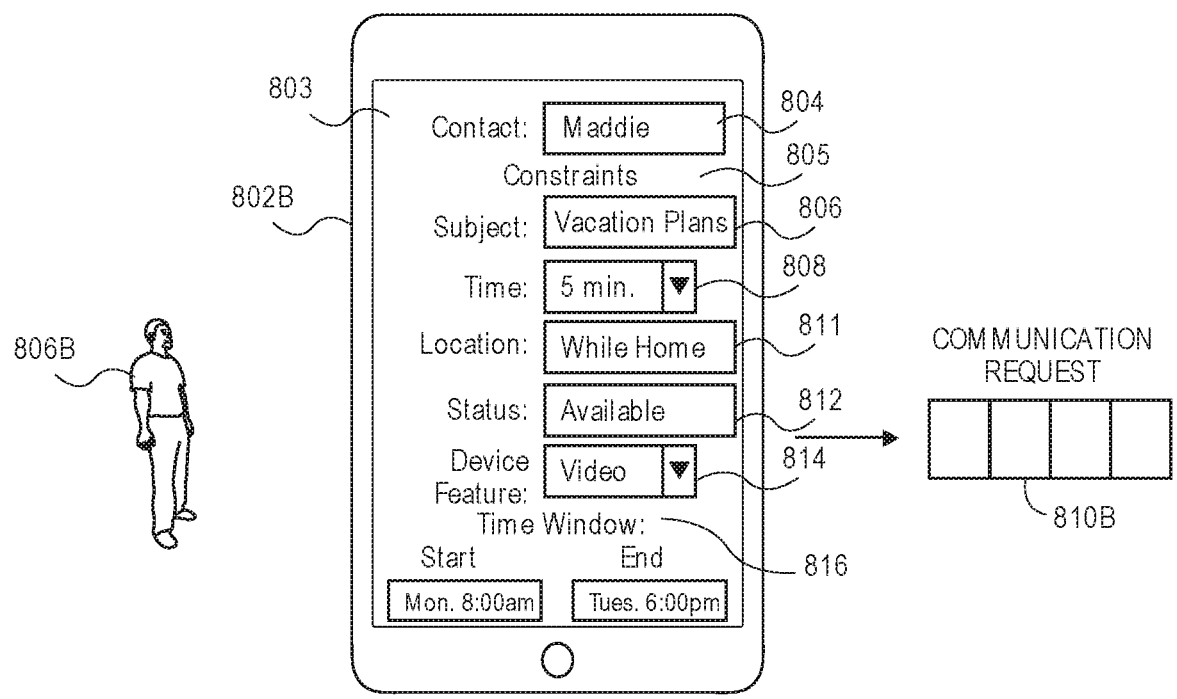

As another example, and referring to FIG. 8B, illustrated is a device 802B that may be utilized to input information that is included in a communication request. In this example, the device 802B includes a touch based display 803 and the user 806B can interact with a user interface presented on the display 803 of the device 802B to input or select information that is to be included in the communication request 810B that is provided to the communication service and/or the example process 700. As illustrated in FIG. 8B, the user 806B may select or input an intended recipient 804 and specify one or more constraints 805. For example, the user may specify constraints such as, but not limited to, a subject 806 (e.g., "Vacation Plan"), a time duration 808 (e.g., 5 minutes), a location of the intended recipient 811 (e.g., "While Home"), a status 812 of the intended recipient (e.g., "Available"), a device feature 814 for the device utilized by the intended recipient in the communication session (e.g., "Video"), a start/end time window 816 for the communication session, etc. In other implementations, other forms and/or types of constraints may likewise be specified.

When the user provides the information for the communication request in a manner illustrated in FIG. 8B that utilizes a device 802B to receive inputs specifying one or more intended recipients and one or more constraints, the provided information may be organized into a defined data structure and provided as a communication request 810B from the device to the example process 700 and/or the communication service.

In some implementations, the example process 700 and/or the communication service may utilize one or more of the constraints to determine when and/or whether to even attempt to establish a requested communication session. For example, upon receiving the communication request discussed with respect to FIG. 8B, the constraints may be considered to determine if one or more of the conditions associated with those constraints are already satisfied. For example, if a status constraint of the intended recipient is "Available" but the communication service determines that the intended recipient is not available, a communication session may not be initiated because a condition for that constraint is already satisfied. However, the communication service may continue to monitor the status of the intended recipient and, if their status becomes available, and any other conditions corresponding to constraints have not been satisfied, the example process 700 may continue and a communication session established. For example, if the intended recipient does not become available until after 6:00 pm on Tuesday, as specified by the time window 816 constraint, the communication will not be established because a condition for that constraint has been satisfied.

In some implementations, a constraint or a condition of the constraint may include a particular word, phrase, sound or other input that is required to create the constraint and/or modify the constraint. For example, the communication service may include information corresponding to a secret project named Koko and any constraint relating to project Koko may require an authorization code for creation. Accordingly, if a user submits a request that includes a constraint relating to project Koko (e.g., "Device A, Call Maddie to discuss Koko"), and/or requests to add a constraint during a communication session that relates to project Koko, the communication service may require that the user provide an authorization code before the constraint is created and monitored as part of the communication session. In other examples, a user may associate an authorization code with a constraint such that the authorization code is required to modify the constraint. For example, if a first user creates a constraint for a communication session, the first user may specify an authorization code that, if provided, will allow the constraint to be modified. An authorization code may be any form of input including, but not limited to, audible, movement (e.g., as detected by a video camera and/or gyroscope), inputs into an input component of a device (e.g., keyboard inputs), etc.

Returning to FIG. 7, upon receipt of the communication request, the communication request is processed to determine an intended recipient, as in 704. The intended recipient may be, for example, a specific user, multiple specific users, a specific device, multiple specific devices, a group or type of users, a group or type of devices, etc. For example, the communication request may include an indication of a user by, for example, including the name of the user. As another example, if multiple users are the intended recipients, the communication request may include the names of multiple users, an indication of a group of users, etc. In such examples, the example process 700 may query a data store to determine users associated with the user that submitted the communication request and that have a name, or names corresponding to the names included in the communication request. If a match is determined, the matched user is determined to be the intended recipient. If there are multiple users with the same name as that which is included in the communication request, the example process 700 may request from the user that submitted the communication request a clarification or selection of the multiple users to determine the intended recipient(s).

If a specific device (e.g., a user's cellular phone) is the intended recipient, the communication request may include an identifier (e.g., telephone number) associated with the specific device. Likewise, if multiple specific devices are the intended recipients, the communication request may include identifiers associated with each of the multiple devices. In some instances, the user that submitted the request may specify both a specific user and a specific device, or specific device type. For example, the first user may submit a communication request in the form of a phrase, such as, "Establish a communication request with Maddie on one of her devices that has video capabilities." In such an example, the phrase is processed using, for example, ASR and NLU, to determine both the specific user, "Maddie," and the type of device, "one of her devices that has video capabilities." The example process 700 may query a data store to determine a user having an identifier of "Maddie" that is associated with the user that submitted the request and also determine one or more devices associated with the user identified as "Maddie" that have video capabilities.

In still other examples, if the intended recipients are a group or type of users, the communication request may include information indicating the group or type of users. As an example, a first user may output a phrase such as "Establish a communication session with someone in the tax department of my office that knows about international tax law." In such an example, the phrase, received by the example process 700 as digital audio data, is processed, for example using ASR and NLU, to determine both a group of intended recipients "someone in the tax department of the first user's office" and the type of users within that group "that knows about international tax law." In such an example, the example process 700 may query a data store that includes information relating to users that indicate, among other information, users that are associated with the first user's company, that work in the tax department of that company, and that know or have a background related to international tax law. The results of the query may identify one or more persons that satisfy the communication request and are, thus, the intended recipients of the communication request.

In addition to determining the intended recipient(s), the example process 700 determines any constraints included in the communication request, as in 706. If the communication request is received in a form of structured data, a field may be defined in the data structure to indicate any constraints for the communication request. If the communication request is received as, for example, digital audio data, the digital audio data may be processed (e.g., using ASR and NLU) to determine if one or more constraints are included in the communication request. For example, referring again to FIG. 8A, if the communication request 810A is received as digital audio data of the user provided phrase "Device A, Call Maddie for five minutes," the communication request may be processed using ARS/NLU to determine the constraint "five minutes."

Upon determining the intended recipient(s) and any constraints, the example invitation process (FIG. 9) is performed to generate and send an invitation with any determined constraint to the intended recipient(s), as in 708. The example invitation process is discussed in further detail below with respect to FIG. 9.

After an invitation that includes any constraints is sent to the intended recipient(s) by the example process 900 (FIG. 9), a response is received from the intended recipient(s), as in 710. A determination is then made as to whether the response is an acceptance, a conditional acceptance with one or more constraints, or a rejection, as in 712. If the response is a conditional acceptance that includes one or more constraints specified by the intended recipient, the constraints are negotiated, as in 714. As discussed above, constraints may be negotiated by the source of the communication request and the intended recipient of the communication request until agreed upon constraints are determined, or constraints are not agreed upon.

To negotiate constraints, the example process may send data back to the device from which the communication request was received and receive a response from that device indicating whether the constraints specified by the intended recipient as part of the conditional acceptance are accepted, rejected, or whether the source of the communication request has other proposed constraints. If other proposed constraints are returned, the example process 700 may provide data back to the intended recipient to determine if those other proposed constraints are accepted, rejected, or the intended recipient has yet further constraints. This exchange of constraints may continue until the source and the intended recipient agree upon constraints for the communication session or are unable to reach agreement. If agreement is not reached, the example process 700 completes and the communication session is not established. If constraints are agreed upon as part of the constraint negotiation (block 714) or if it is determined at decision block 712 that the response is an acceptance, rather than a conditional acceptance or a rejection, the example process determines one or more owners for each constraint, as in 716.

In some implementations, a constraint owner may indicate the user or device that is authorized to modify or remove a constraint from a communication session. For example, if a first user specifies a constraint of five minutes for a communication session between the first user and the second user, it may be determined that the first user is the constraint owner and the only one that can modify or remove the constraint. If, during the communication session, the second user requests to modify the constraint, as discussed further below with respect to FIG. 11, the communication service may either reject the request or submit the request to the constraint owner for acceptance or rejection.

A constraint owner may be determined based on the user or device that specified the constraint, and/or based on other factors. In some implementations, there may be multiple constraint owners for a constraint and/or multiple constraints for a communication session, each constraint associated with one or more of the same or different constraint owners. For example, an employee may submit a communication request to talk to his employer and specify a constraint of a time duration (e.g., 5 minutes) and a subject (e.g., vacation time) and the employer may accept the communication request such that a communication session is established between devices of the employee and the employer. In this example, the communication service may maintain information relating to the employer/employee and, rather than determining that the owner of the constraints is the employee, the communication service may specify that both the owner and the employee are the owners, or alternatively determine that the employer is the owner of the constraints. In some implementations, one or more profiles, such as user profiles, may be maintained by the communication service that are utilized to aid in determining owners for constraints related to a communication request.

In some implementations, the response may be an acceptance with an indication of an available constraint extension. For example, if the proposed constraint is to talk for five minutes, the response to the invitation with the constraint may be an acceptance and an indication that the recipient is available for a longer period of time, if needed (e.g., ten minutes). In such an example, the constraint may be established at the specified condition (e.g., five minutes) but the constraint may be modified by the constraint owner if needed without approval from the recipient.

Returning again to FIG. 7, upon determining the constraint owner(s) for any constraints associated with the communication request and that the communication request and any constraints have been accepted or agreed upon, a communication session is established between the determined devices, as in 718.

As discussed above, in some implementations, the communication session may be established when a request to establish a communication session is received, independent of whether the request includes a constraint. In such examples, once the constraint(s) is agreed upon, the communication session is maintained. If the constraint is not agreed upon, the communication session may be terminated.

In some implementations, constraint based communication sessions may be scheduled and/or recurring. For example, a user may specify that a constraint based communication session with a second user (or multiple users) is to occur at a specific time on a specific day and further specify additional constraints for the communication session (e.g., thirty-minute duration, topic, etc.). Such a scheduled constraint based communication session may be a single occurrence or recurring (e.g., weekly). The other user(s) may be provided an opportunity to agree to the conditions prior to the scheduled constraint based communication session and/or to further alter the constraints for the communication session. At the scheduled time, a communication session is established between the user devices and the constraint(s) monitored during the communication session. When a condition of the constraint is satisfied, the communication session is terminated.

Figure 9:
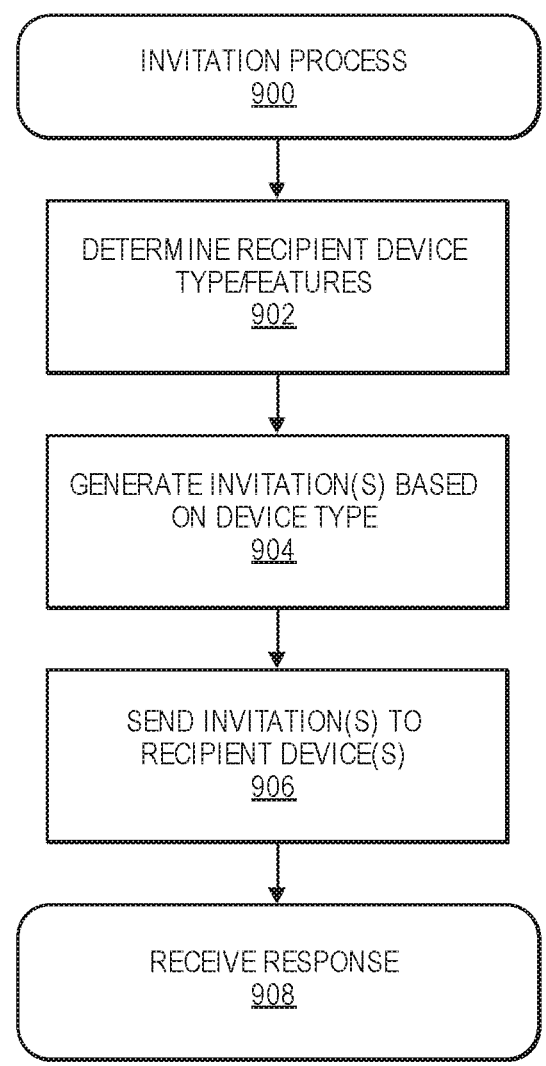
FIG. 9 illustrates an example invitation process, according to an implementation.

FIG. 9 illustrates an example invitation process 900, according to an implementation. As discussed above, when a communication request is received, one or more intended recipients for the communication request are determined. The intended recipients may be specific users, specific devices, groups or types of users, groups or types of devices, etc. If the intended recipient is indicated as a user, one or more devices associated with that user are determined that will be utilized to send an invitation to the user and/or for the communication session.

Prior to sending an invitation, the example process determines a device type and/or features of a device to which the invitation is to be sent, as in 902. The device type may specify a specific device, or specify a device category. For example, the device type may specify whether the device is a cellular enabled device (e.g., cellular phone, smart phone), an Internet Protocol (IP) device (e.g., Voice over IP (VoIP) phone), a traditional or landline phone, a desktop computing device, a laptop, a wearable device, a tablet, etc. Alternatively, or in addition thereto, device features for the device may be determined. Device features include, but are not limited to, audio, video, tactile, touch, gaze detection, etc.

Based on the determined device type and/or device features for the intended recipient device, an invitation is generated, as in 904. The invitation includes an identification of the source of the communication request and any constraints specified by the source of the communication request. The structure of the communication request may vary based on the device type and/or device features. For example, if the device is an audio based device, the invitation may be structured such that the receiving device can generate an audio based message that presents to the user of the device information relating to the communication request (e.g., a source of the communication request and any constraints). If the device is a video based device, the invitation may be structured such that the receiving device can generate a video output corresponding to a display size of the device that presents to the user of the device information relating to the communication request. If the device is a cellular phone with a display, like many existing smartphones, the invitation may be formed according to a cellular telecommunication protocol. In such an example, the protocol may be modified such that the transmitted data, in the form of the invitation, includes both the source of the communication request and the constraint information. The cellular device, upon receiving the invitation, may present on the display the source of the communication request and the constraint(s) specified in the communication request so that the user can decide whether to accept or reject the invitation.

In implementations where the receiving device is a more traditional device, such as a landline telephone or a cellular telephone, a connection may be established between the communication service and the device and the communication request may be provided to the user over the established communication. For example, if the intended recipient is associated with a landline phone, the communication service may send an initial invitation to the landline phone that causes the phone to ring or otherwise notify a user of an incoming call. The user answers the landline phone and a communication channel is established between the communication service and the landline phone. The communication service then transmits over the communication channel the invitation, for example audibly, to present to the user the request for a communication session with an indication of the source of the communication request and the constraints specified by the source of the communication request. The user of the landline phone may then verbally and/or through use of inputs available on the landline phone (e.g., keypad) accept, conditionally accept, or reject the communication request. In some implementations, the user may specify other constraints as part of a conditional acceptance.

The generated invitation is then sent to the determined recipient device(s), as in 906. The recipient device, upon receiving the invitation, presents the information included in the invitation. A user may then provide a response that is transmitted by the recipient device and received by the example process, as in 908.

For example, referring to FIG. 10A, illustrated is an audio based device 1002A that receives an invitation and presents information included in the received invitation, according to an implementation. As illustrated, an invitation 1012A is sent to the device 1002A and the device 1002A generates an output 1013A using a speaker and/or other audio output components. The output 1013A includes an indication of the source of the communication request, in this example the name of the user, "Sophie," that submitted the communication request, and a constraint specified by the source of the communication request. In this example, the constraint is a time duration of "five minutes." In some implementations, the invitation and/or the device 1002A that receives the invitation 1012A may structure the output such that it is presented in a natural language or sentence structure, such as "Sophie wants to talk for five minutes." As discussed above, the user may provide a response, such as an acceptance, a conditional acceptance, or a rejection, and the device 1002A sends response data 1014A indicating the response received from the user.

As another example, referring to FIG. 10B, illustrated is an audio based device 1002B that receives an invitation and presents information included in the received invitation, according to an implementation. Similar to the discussion with respect to FIG. 10A, an invitation 1012B is sent to the device 1002B and the device 1002B generates an output 1013B using a speaker and/or other audio output components. The output 1013B includes an indication of the source of the communication request, in this example the name of the user, "Sophie," that submitted the communication request, and, in this example, multiple constraints specified by the source of the communication request. In this example, the constraints are a time duration and a subject. Specifically, the time duration constraint is "ten minutes" and the subject constraint is "vacation plans." As discussed above, the user 1006 may provide a response, such as an acceptance, a conditional acceptance, or a rejection, and the device 1002B sends response data 1014B indicating the response received from the user. In this example, the user 1006 provides a response 1015B in the form of a conditional acceptance "Ok, but I only have five minutes." As discussed above with respect to FIG. 7, the conditional acceptance is processed and the provided constraints may supplement or replace the constraints included in the invitation. In this example, the invitation included two constraints, a time duration and a subject. The response includes a time duration constraint. In such an example, the subject constraint may be considered accepted and agreed to but the time constraint may be considered rejected by the user 1006 and the time constraint provided by the user 1006 with the conditional acceptance may be transmitted back to the source of the communication request for acceptance, conditional acceptance, or rejection.

As another example, referring to FIG. 10C, illustrated is a display based device 1002C that receives an invitation and presents information included in the received invitation, according to an implementation. As illustrated, an invitation 1012C is sent to the device 1002C and the device 1002C generates an output 1013C that is visually presented on a display 1011 of the device 1002C. The output 1013C includes an indication of the source of the communication request, in this example the name of the user, "Sophie," that submitted the communication request, and a constraint specified by the source of the communication request. In this example, the constraint is "five minutes." In some implementations, the information presented on the display of the device may include one or more input options (e.g., graphical buttons) that a user of the device can interact with to generate a response that is sent by the device 1002C. In this example, the display presents the options of "Ok" to indicate an acceptance of the invitation, a "Not Now" to indicate a rejection of the invitation, or a "Modify" to provide a conditional acceptance and specify one or more constraints for the communication session. Upon selecting one of the input options response data 1014C is generated and sent by the device. In some implementations, if the user selects the "Modify" input, one or more other user interfaces may be presented to the user by the device to allow the user to specify constraints to be included with the conditional acceptance.

As still another example, referring to FIG. 10D, illustrated is a device 1002D in the form of a cellular telephone with a display that receives an invitation and presents information included in the received invitation, according to an implementation. In this example, the invitation may be structured according to one or more cellular telecommunication protocols that allow for data in the transmitted invitation to include an indication of a source of the communication request, one or more constraints specified for the communication request, and/or other information relating to the communication request.

The output 1013D includes an indication of the source 1016 of the communication request, in this example the name of the user, "Sophie," that submitted the communication request, and, in this example, multiple constraints 1017 specified by the source of the communication request. Specifically, in this example, the time duration constraint is "five minutes" and the subject constraint is "vacation." Because this information is included in the invitation sent to the cellular telephone, the device 1002D, the information relating to the communication request can be presented to the user and provide the user with knowledge about the incoming communication request prior to the user having to accept the request (i.e., answer the incoming call).

Similar to the other examples, the user may provide a response, such as an acceptance, a conditional acceptance, or a rejection, and the device 1002D sends response data 1014D indicating the response received from the user. In this example, the response data 1014D may be transmitted over a data channel of the cellular network and the communication service, upon receiving the response, may proceed to not establish the communication session if the response is a rejection, send data back to the source of the communication request if the response is a conditional acceptance with other constraints, or establish the communication session if the response is an acceptance.

Figure 11:
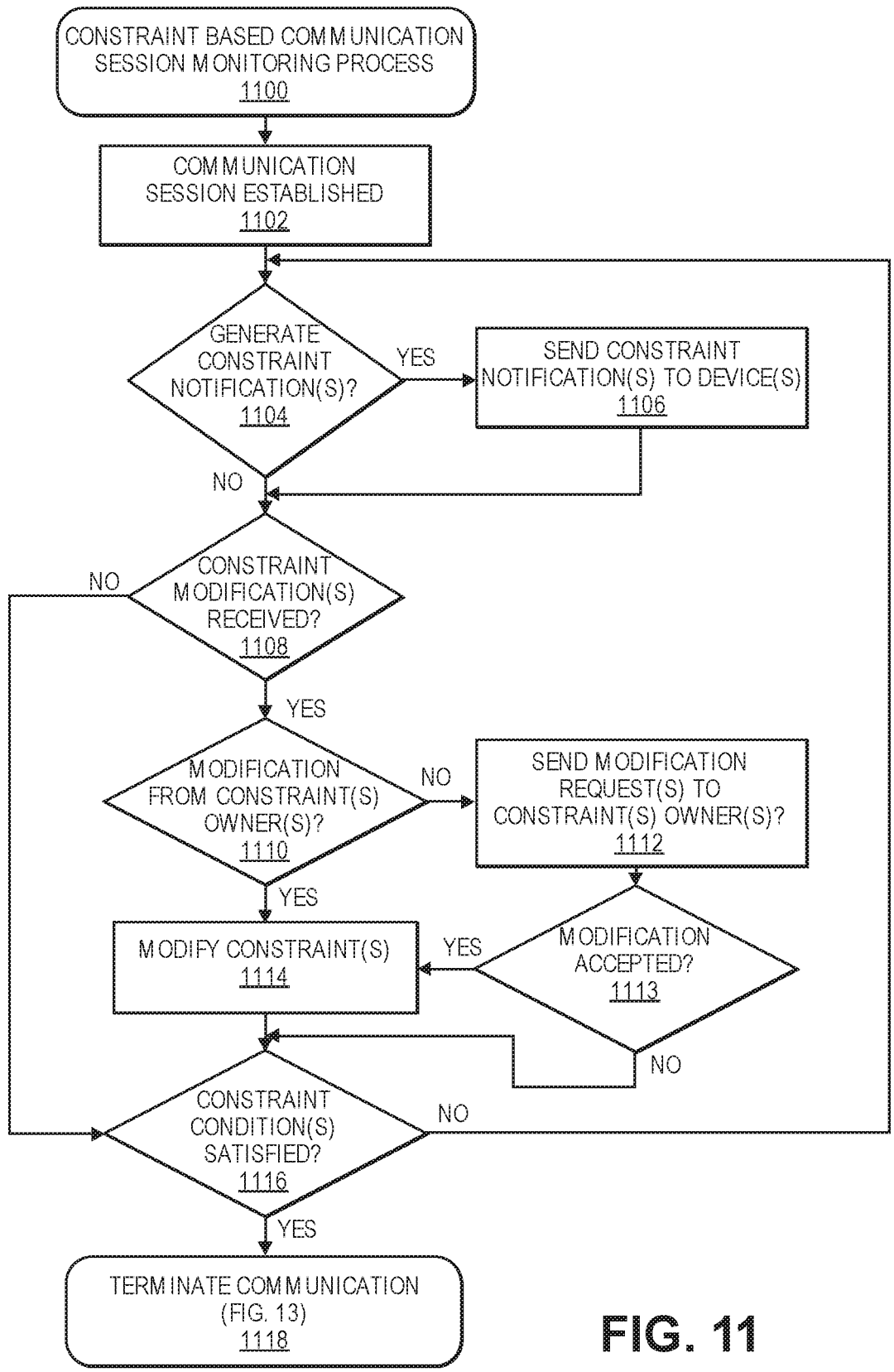
FIG. 11 illustrates an example constraint based communication session monitoring process, according to an implementation.

FIG. 11 illustrates an example constraint based communication session monitoring process 1100, according to an implementation. A communication session may be established between two or more devices and that communication session may include one or more constraints that are to be monitored during the communication session to determine if a condition corresponding to the constraint has been satisfied, as in 1102. During the communication session, a determination is made as to whether a constraint notification is to be generated, as in 1104. A constraint notification may be any type of notification relating to the constraint based communication session and may be provided at any time during a communication session. For example, a constraint notification may be generated and output to one or more devices at an initiation of the communication session to present information to the users involved in the communication session indicating a duration of the communication session. In other examples, as discussed further below, the constraint notifications may be periodically generated during the communication session and/or at a completion or termination of the communication session. In other implementations, users may specify when and/or what types of notifications are to be provided as part of the constraint based communication session.

If it is determined that a constraint notification is to be generated, the constraint notification is generated and sent to the one or more devices, as in 1106. In some implementations, the constraint may be sent to one or more devices that are currently participating in the communication session. Alternatively, or in addition thereto, a constraint notification may be sent to one or more devices that are not involved in the communication session. For example, a user may utilize a first device, such as an audio based device to participate and communicate in a communication session but may specify that constraint notifications are to be sent to a wearable device associated with the user.

Generally, a constraint notification may be generated and sent to one or more devices upon the occurrence of one or more events relating to the communication session and/or a condition corresponding to a constraint associated with the communication session. For example, if a time duration constraint is established for the communication session, when a condition corresponding to the time constraint is satisfied, it may be determined that a constraint notification is to be generated and sent to one or more devices of the communication session.

In addition, a constraint notification may be sent to one, some, or all devices included in a communication session and/or to other specified devices. Likewise, different constraint notifications may be sent to different devices. For example, a first notification may be sent to a device associated with an owner of a constraint that includes an option for the owner to modify the constraint. A second notification, which may be different than the first notification, may be sent to a device associated with another user participating in the communication session that only provides information relating to the constraint, but not an option to modify the constraint. In other examples, other forms and/or content may be included in the constraint notifications.

Figure 12A:
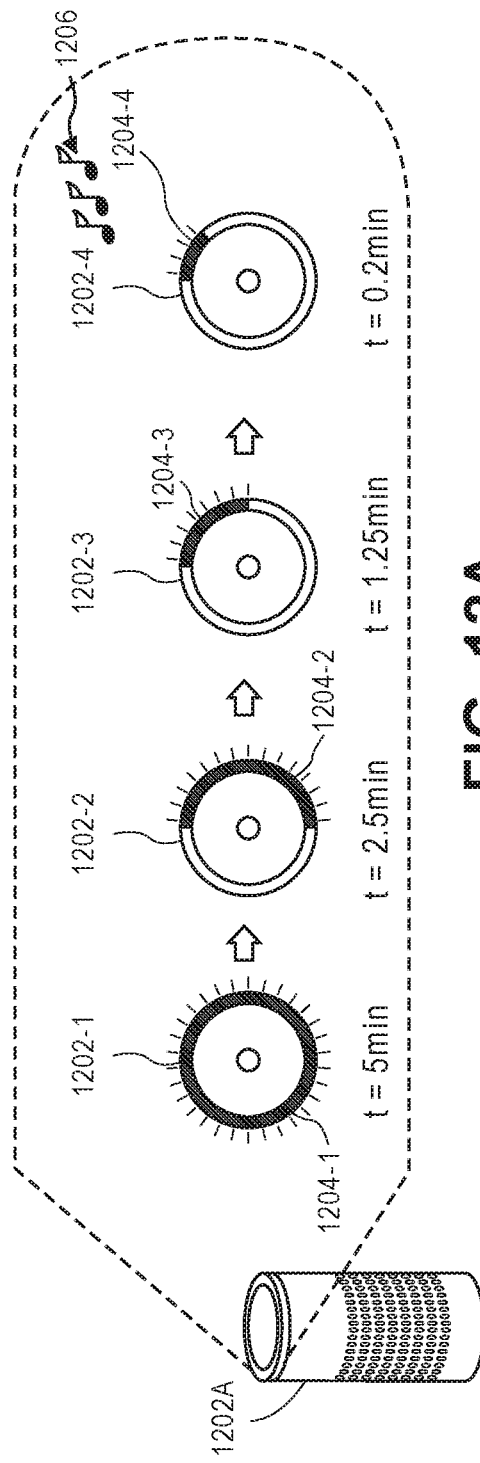
FIGS. 12A-12C illustrate example constraint notifications, according to various implementations.

As illustrative examples, FIG. 12A illustrates a device 1202A that enables audio communication by a user participating in a constraint based notification. If a constraint notification is sent to the device and/or if the device monitors the constraint based communication to determine when to output a constraint notification, such an output, from the illustrated device, may be presented audibly, visually, or a combination of both audibly and visually. The illustrated example shows four different constraint notifications 1204-1, 1204-2, 1204-3, and 1204-4 that are output by the device 1202A during a communication session that includes a time duration constraint. For example, a first constraint notification 1204-1 may be output in the form of a ring of lights around a top perimeter of the device 1202-1 being fully illuminated. As the communication session progress and the time duration (condition) is monitored or elapses, the illumination of the lights may alter accordingly to illustrate that the amount of time remaining before the condition is satisfied is decreasing. For example, if the time-based constraint has a condition of a five-minute duration, when approximately two and one-half minutes remain, a constraint notification 1204-2 in the form of half of the ring of lights around the top perimeter of the device 1202-2 may be illuminated, indicating visually that half of the duration of the communication session remains and half of the communication session has elapsed.

Likewise, at a third time, such as when one and one-quarter minutes remain in the communication session, a third constraint notification 1204-3 in the form of one-quarter of the lights around the top perimeter of the device 1202-3 may be illuminated, indicating that three-quarters of the communication session has elapsed and one-quarter of the communication session remains. Finally, as the duration reaches the set time duration, the illuminated portion of the ring of lights around the top perimeter of the device 1202-4 may continue to decrease to convey a fourth constraint notification 1204-4. Likewise, an audible output 1206 may be emitted from the speakers and/or other output component of the device to notify the user that a constraint associated with the communication session is about to be satisfied and the communication session terminated. In some examples, the audible output may be a tone, music, and/or speech.

In other implementations, rather than, or in addition to, illuminating different portions of the ring of lights along the top of the device to present constraint notifications, the lights may be illuminated in different colors, illuminated to present a rotating ring of lights in which the rotational speed of the lights varies for different constraint notifications, illuminates in a pattern, such as a series of flashes, illuminates in different patterns for different constraint notifications, etc.

Figure 12B:
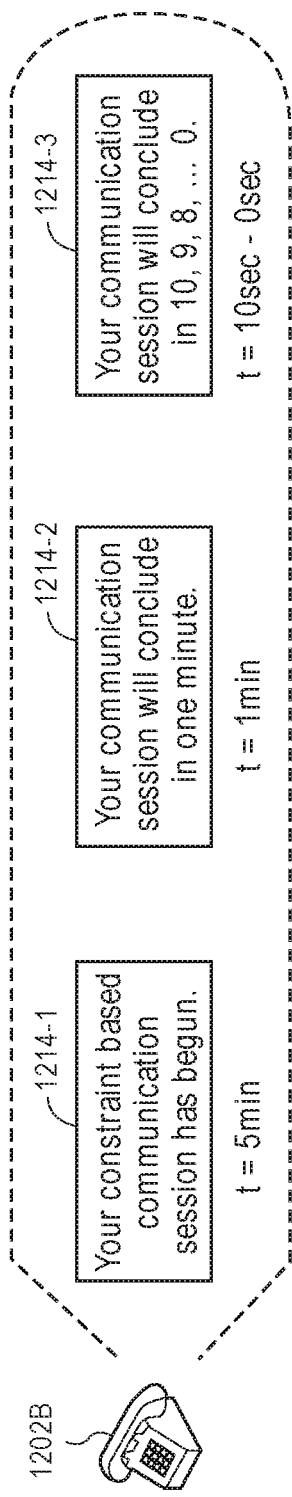

As another example, FIG. 12B illustrates a traditional landline telephone device 1202B that may be utilized by a user to participate in a communication session, according to the implementations discussed herein. If a constraint notification is sent to the device, the constraint notification is presented audibly to the user. For example, the communication service may overlay or include the constraint notification in the form of an audio signal in an audio channel established with the device 1202B such that the constraint notification is audibly presented to the user of the device as audio output from the device 1202B. The illustrated example shows three different constraint notifications 1214-1, 1214-2, and 1214-3 that are sent to and audibly output by the device 1202B during a communication session. For example, a first constraint notification 1214-1 may be audibly output by the device 1202B indicating that the constraint based communication session has begun. In this example, the constraint notification is audibly output in the form of human speech. In other implementations, the constraint notification may have or include other audio characteristics, such as, but not limited to, tones, music, etc.

As the communication session progress and the time duration (condition) is monitored or elapses, additional constraint notifications may be sent to and audibly output by the device 1202B. For example, if the time-based constraint has a condition of a five-minute duration, it may be determined that a constraint notification is to be generated when approximately one minute remains in the communication session. When it is determined that one minute remains, a second constraint notification 1214-2 is sent to the device 1202B and audibly output, in this example in the form of human speech indicating to the user of the device 1202B that "Your communication session will conclude in one minute." As the duration reaches the set time duration, a countdown constraint notification 1214-3 may be sent to and output by the device 1202B that counts down the final moments until the condition of the constraint is satisfied.

Figure 12C:
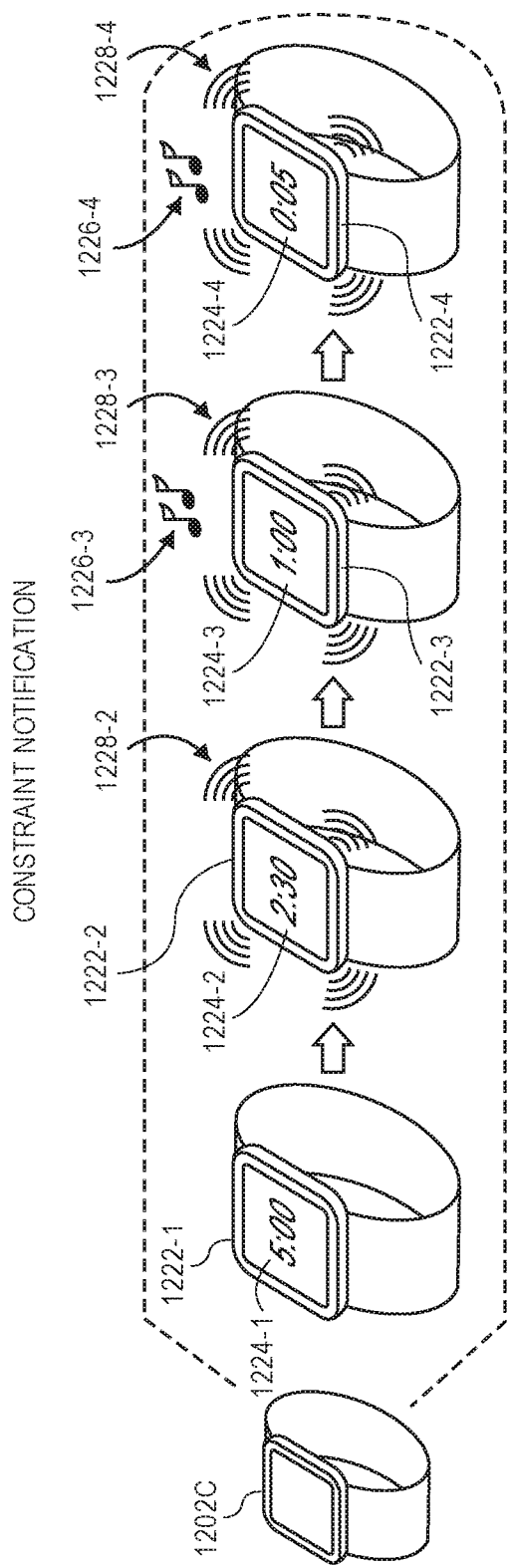

As still another example, FIG. 12C illustrates a wearable device 1202C that may be utilized to present constraint notifications, according to the implementations discussed herein. As discussed above, in some implementations, a user may utilize a first device, such as an audio device or video device to participate in the communication session and may utilize another device to receive and be presented with constraint notifications, such as a wearable device. In this example, the wearable device 1202C includes a display (e.g., a touch based display), an audio output (e.g., a speaker), and tactile output (e.g., an actuator).

If a constraint notification is sent to the device 1202C, the device 1202C may present the constraint notification using audible output, visual output, tactile output, or a combination of two or more of audible output, visual output, and tactile output. The illustrated example shows four different constraint notifications 1224-1, 1224-2, 1224-3, and 1224-4 that are output by the device 1202C during a communication session that includes a time duration constraint. For example, a first constraint notification 1224-1 may be output visually on a display of the device 1222-1 in the form of graphical digits illustrating a time remaining before the condition (time duration) of the constraint for the communication session is satisfied.

As the communication session progress and the time duration (condition) is monitored or elapses, the presentation on the display of the device may countdown and continually present information indicating the remaining time duration. In other implementations, the display may only present information when a user associated with the device looks at or otherwise interacts with the device 1202C (e.g., touches the device). In other implementations, as various conditions are satisfied, the constraint notifications may be updated, increased, and/or other forms of output may be utilized to inform the user of the constraint notification. For example, if the time-based constraint has a condition of a five-minute duration, when approximately two and one-half minutes remain, a constraint notification 1224-2 in the form of digits ("2:30") may be presented on the display of the device 1222-2 and a tactile 1228-2 output may be generated by activating the actuator in the device that causes the device to vibrate.

Likewise, at a third time, such as when one minute remains in the communication session, a third constraint notification 1224-3 in the form of digits ("1:00") is presented visually by the display of the device 1222-3, tactile output 1228-3 is generated by vibrating the device 1222-3, and audible output 1226-3 is generated from a speaker of the device 1222-3 and presented in combination to further alert the user associated with the device 1222-3 of the constraint notification. Finally, as the duration reaches the set time duration, the display of the device 1222-4 may continue to present digits ("0:05") indicating an amount of the time duration remaining. Likewise, one or more of the tactile output 1228-4 and/or the audible output 1226-4 may increase. For example, the amount or duration of the tactile output 1228-4 may increase, or a tactile output pattern may be altered or utilized to indicate an amount of the time duration remaining. In a similar manner, the tone of the audio output 1226-4, the pattern of the audio output 1226-4, the content of the audio output 1226-4, the frequency of the audio output 1226-4, the amplitude of the audio output 1226-4, or any combination thereof may likewise be altered to alert the user to the constraint notification.

As illustrated by the examples in FIGS. 12A-12C, any variety of devices and/or forms of output may be utilized to receive and present constraint notifications to users. Likewise, the form, content, and/or frequency of constraint notifications may vary from user to user and/or device to device. For example, a user may specify a frequency with which the user desires to receive constraint notifications and/or may specify a device type or presentation form that is preferred for the constraint notification. Likewise, as discussed above, in some implementations, the content of the constraint notification may be different for different users participating in the communication sessions and the presentations of constraint notifications discussed with respect to FIGS. 12A-12C are provided as examples only.

Returning to the example process 1100 of FIG. 11, a determination is made as to whether a constraint modification has been received, as in 1108. A constraint modification may be any request to modify or alter a constraint associated with the communication request and/or to establish a new constraint during a communication session. If, for example, the constraint is a time duration, a modification request may be to extend or add time to the time duration, shorten or decrease time from the time duration, or replace the time duration with a modified time duration. In some examples, a constraint modification request may be requested to add a new constraint to the communication session. For example, if a communication session only includes a single constraint, such as a time duration, the constraint modification request may include a request to add another constraint, such as a subject constraint. As another example, if the communication session does not include a constraint, a constraint may be established during the communication session such that the communication session becomes a constraint based communication session.

If a constraint modification request is received, a determination is made as to whether the modification request was received from a device associated with the constraint owner and/or from the constraint owner, as in 1110. A constraint may be determined to be received from a constraint owner regardless of the device from which the constraint was received based on, for example, speech or audio recognition performed on the received modification request to determine whether the modification request was received from the constraint owner.

If it is determined that the constraint modification request was not received from the constraint owner, the modification request may be sent to the constraint owner, as in 1112. For example, the modification request may be sent to the constraint owner indicating that another user participating in the communication session is requesting to modify the constraint and provide details relating to the requested modification. In other implementations, if it is determined that the modification request is not from the constraint owner, the example process may reject or ignore the modification request and proceed to block 1116 as if no modification request was received.

If a modification request is sent to an owner of the constraint, a determination is made as to whether a constraint modification request acceptance has been received from a device associated with the owner indicating an acceptance of the modification request, as in 1113. If the owner of the constraint accepts a requested modification to the constraint, or if it is determined at decision block 1110 that the modification request was received from the owner, the constraint is modified based on the modification request, as in 1114. In some implementations, agreement must be received from each user participating in the communication session before a constraint is modified, regardless of the constraint owner.

In other examples, it may be determined whether the modification request includes an authorization code associated with the constraint. As discussed above, an authorization code may be associated with a constraint that is required to modify the constraint. In such an example, if a modification request is received, it may be determined whether the required authorization code has been provided, rather than or in addition to determining whether the modification request is from the owner of the constraint. If the authorization code has been provided, the constraint is modified based on the modification request, as in 1114. If the authorization code is not provided, the modification request may be ignored and/or the example process 1100 may request that the authorization code be provided.

After modifying a constraint, or if it is determined at decision block 1108 that no constraint modification request was received, a determination is made as to whether one or more conditions corresponding to a constraint associated with the communication session has been satisfied, as in 1116. For example, if the constraint is a time duration, the condition may be five minutes. When five minutes have elapsed, it may be determined that the constraint has been satisfied. If it is determined that a condition has not been satisfied, the example process 1100 returns to block 1104 and continues. However, if it is determined that a condition of the constraint has been satisfied, the communication session is terminated, as in 1118.

Figure 13:
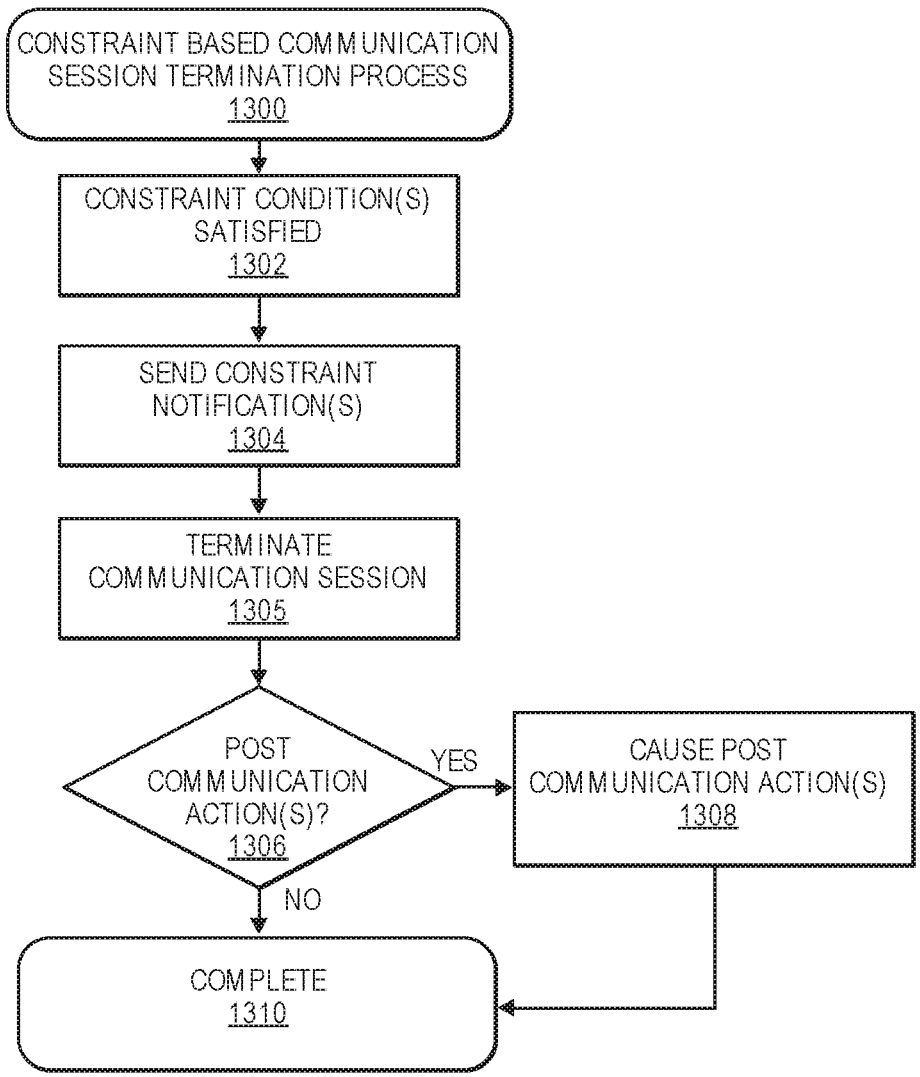
FIG. 13 illustrates an example constraint based communication session termination process, according to an implementation.

FIG. 13 illustrates an example constraint based communication session termination process 1300, according to an implementation. The example process begins upon determining that one or more constraint condition(s) that are to initiate a termination of the communication session have been satisfied, as in 1302. For example, if the constraint is a time duration and the condition is five minutes, when the duration of the communication session has reached five minutes, the condition will be satisfied.

Upon determining that a condition has been satisfied, a constraint notification is sent to one or more of the devices involved in the communication session and/or to one or more other devices not involved in the communication session for presentation to one or more users, as in 1304. As discussed above, different constraint notifications may be sent to different users and/or different devices. Likewise, users may configure and/or specify the content, frequency, or type of constraints to be provided as part of the communication session. For example, a first user that is an owner of the constraint may receive a constraint notification that indicates to the first user that the constraint has been satisfied, the communication session is being terminated, and provide the user the option to modify or remove the constraint, thereby causing the communication session to continue. In comparison, the second user, who is not a constraint owner, may receive a communication session indicating that the constraint for the communication session has been satisfied and the communication session is being terminated. The constraint notification may also indicate to the second user that the second user may perform one or more post communication actions, as discussed further below.

In still other examples, the constraint notification may be specific to each user. For example, a constraint notification sent to the first user may inform the first user that the constraint has been satisfied, the communication session is being terminated, and provide additional user specific information to the first user. Such user specific information may include, but is not limited to, an indication of a next task to be performed by the first user (e.g., the next meeting for the first user), a user specific reminder or post communication session activity for the user, etc. Likewise, the second user may receive a notification indicating to the second user that the constraint has been satisfied, the communication session is being terminated, and provide information to the second user that is specific to the second user.

Upon sending the constraint notifications, the communication session is terminated, as in 1305. In some implementations, the example process 1300 may wait a defined period of time (e.g., five seconds) after sending the constraint notifications prior to terminating the communication session to allow an opportunity for the owner of the constraint to modify the constraint before the communication session is terminated. In another implementation, the constraint notification discussed above with respect to block 1304 may be sent at a time prior to the condition being satisfied (e.g., five to ten seconds before the condition is satisfied) so that the owner of the constraint has time to modify the constraint before the condition is satisfied and the communication session terminated.

In addition to terminating the communication session, a determination is made as to whether one or more post communication actions are to be performed, as in 1306. A post communication action may include, but is not limited to, establishing a second communication session, sending a text message, sending a voice message, sending a video message, creating a meeting request, receiving a text message, receiving a voice message, receiving a video message, storing a text message, storing a voice message, storing a video message, storing a recording of the communication session, generating an action, purchasing an item, calendaring an event, incrementing a communication session count, etc. If it is determined that one or more post communication actions are to be performed, the example process 1300 causes or facilitates the post communication action, as in 1308. For example, if the post communication action includes the second user sending a voice message to the first user, the example process 1300 may prompt the user to provide the voice message, receive from a device of the second user the provided voice message, store the voice message in a data store, and provide a notification to the first user regarding the stored voice message.

After causing the post communication action(s), or if it is determined that no post communication actions are to be performed, the example process completes, as in 1310.

As illustrative examples, FIGS. 14A-14D illustrate example constraint notifications provided as part of a constraint based communication termination, according to an implementation. Referring first to FIG. 14A, at completion of a communication session, an audio based device 1402A may receive a constraint notification 1422A that is audibly presented to the user indicating that the communication session has completed. Likewise, the lights on the audio device may illuminate as part of the constraint notification. FIG. 14B illustrates another example constraint notification 1422B that is audibly presented, in this example by a traditional landline telephone device 1402B. As discussed above, the constraint notification may be inserted into an audio channel established with the device 1402B and presented audibly by the device 1402B.

Continuing with FIG. 14B, the constraint notification 1422B provides both a notification that the communication session has completed, with the audio output "Your communication session has completed" and provides information to the user indicating that a post communication activity may be performed with the audio output "Press one to leave an additional communication for Garry." As will be appreciated, various forms of interaction may be utilized to cause post communication actions. For example, FIG. 14B illustrates that a post communication action may be caused by the user pressing one on the traditional landline device. Alternatively, or in addition thereto, audio input from the user may be received and processed to determine if the user desires to perform a post communication activity.

FIG. 14C illustrates a wearable device 1402C that is used to visually present a constraint notification 1422C indicating that the communication session has completed and providing the user the option to perform a post communication activity. Specifically, in this example, the wearable device 1402C displays the statement "Communication session completed" and includes a graphical button 1424C that includes the statement "Send Additional Communication." The user can interact with the display to select the graphical button 1424C and one or more additional user interfaces may be presented so that the user can send an additional communication, such as a text message, email, audio recording, etc.

FIG. 14D illustrates a portable device 1402D, such as a tablet, that is used to visually present a constraint notification 1422D indicating that the communication session has completed and providing the user the option to perform one or more post communication activities. Specifically, in this example, the portable device 1402D displays the statement "Your communication session has completed" and includes a graphical button 1424D that includes the statement "Send Additional Communication" and the graphical button 1426D that includes the statement "Take Other Actions." The user can interact with the display to select the graphical button 1424D and one or more additional user interfaces may be presented so that the user can send an additional communication, such as a text message, email, audio recording, etc. Alternatively, the user may interact with the display and select the graphical button 1426D and be presented with one or more other additional user interfaces that allow the user to perform one or more other post communication activities, such as obtain a recording of the communication session, schedule a meeting, initiate another communication session, etc.

As illustrated and discussed with respect to FIGS. 14A-14D, the constraint notification may be structured for presentation according to the device and/or device capabilities that is used to present the constraint notification to the user. For example, the audibly output constraint notification discussed with respect to the landline device 1402B may be structured based on the capabilities of that device so that the user can perform one or more post communication activities utilizing the features and capabilities of that device (e.g., the keypad buttons). Alternatively, audible constraint notifications may be structured such that the user is requested to provide an audible response that is received by the device, such as device 1402A (FIG. 14A) or device 1402B (FIG. 14B) and processed using, for example, ASR and NLU, by the device or transmitted to a remote computing resource and/or the communication service for processing to determine an intent of the user (e.g., to perform one or more post communication activities).

Likewise, when constraint notifications are presented visually, such as illustrated in FIG. 14C and FIG. 14D, the content to be display may be adjusted or selected based on the display size of the device. For example, because the display of the wearable device 1402C (FIG. 14C) is small, the information included in the constraint notification may be reduced compared to the information included in a constraint notification presented on a device with a larger display, such as device 1402D (FIG. 14D).

As discussed above, user provided phrases, such as communication requests, constraint modification requests, requests for post communication activities, etc., may be received and processed by a device and/or by the communication services using ASR and NLU. ASR and NLU can be computationally expensive. That is, significant computing resources may be needed to process ASR and NLU processing within a reasonable time frame. Because of this, a distributed computing environment may be used when performing speech processing. A typical such distributed environment may involve a local device, such as one of the devices discussed above that may be utilized by a user to participate in a communication session, having one or more microphones being configured to capture sounds from a user speaking and convert those sounds into an audio signal. The audio signal/data may then be sent to a downstream remote device for further processing, such as converting the audio signal into an ultimate command, such as a communication request, an acceptance of an invitation, a conditional acceptance of an invitation, a constraint modification request, a post communication activity request, etc. The command may then be executed by a combination of remote and local devices depending on the command itself.

A user utterance or phrase may include a command. For example, the command may be a simple communication request (e.g., "Call Maddie," or "Establish a communication session with Sophie," etc.), to more detailed commands, such as a constraint based communication request that includes one or more constraints (e.g., "Call Maddie for five minutes," or "Establish a communication session with Sophie that is limited to ten minutes and the topic of homework."). In addition to establishing communication sessions, other commands may be received and processed by the implementations discussed herein. Other types of commands may include queries for information (e.g., "what is the capital of France?") to more detailed questions involving time, place, multiple entities, etc. (for example, "when was Jane Doe married to John Doe?"). Further, commands may range in specificity and/or complexity, for example, one command may be "set a timer for 5 minutes" whereas another may be "play the latest album by the band A." Different queries may thus involve different intents, that is, different utterances may be asking the system to perform different operations. In the examples and implementations discussed above with respect to FIGS. 1-14D, the commands have been related to the intents of establishing constraint based communication sessions, modifying constraints, and other actions performed with respect to communication sessions. Each of the commands include an entity and an intent. In order to perform the command, the system must be able to determine the entity and the intents. An entity is a person, place, thing, etc., that has an identity. The intents are the actions to be performed, such as call an entity, establish a communication session, include a constraint in a communication session, modify a constraint, perform a post communication action, etc.

As can be appreciated, natural language understanding involves a complex analysis of text (which may be obtained either from a spoken utterance or from some other source) and potentially other data to determine the text's precise meaning. The process of identifying the intent of an utterance (i.e., the ultimate desired result of the command) may be referred to as intent classification. The process of identifying an entity in an utterance is a two-stage process wherein the first stage, entity recognition, involves identifying a mention of an entity in text needed to complete the intent (sometimes called slots) and the second stage, called entity recognition, actually matches the text of the entity to a specific entity known to the system.

Present NLU query answering systems typically employ a multi-domain architecture wherein each domain represents a certain subject area for a system. Example domains include weather, music, shopping, etc. Each domain is typically configured with its own intents, slot structure, or the like as well as its own logic or other components needed to complete the NLU processing for a particular query. Thus, in order to configure a system to handle a new function, intents, slots and other items used for speech processing need to be specially designed, configured, and tested for each new domain. This leads to significant resource expenditures to train and enable the system to handle additional domains.

Further, during runtime, a speech processing system may process a single utterance using multiple domains at the same time, or otherwise substantially in parallel. As the system may not know ahead of time what domain the utterance belongs in until the speech processing is complete, the system may process text of an utterance substantially simultaneously using models and components for different domains (e.g., books, video, music, etc.). The results of that parallel processing may be ranked, with the highest ranking results being executed and/or returned to the user, as appropriate.

FIG. 15 shows a system 1500 configured to perform NLU processing. A system 1500 may include one or more devices 1502 local to user(s) 1506, as well as one or more networks 1599 and one or more servers 1520 connected to device 1502 across network(s) 1599. The server(s) 1520 (which may be one or more different physical devices) may be capable of performing traditional speech processing (such as ASR, NLU, query parsing, etc.) as described herein. A single server may be capable of performing all speech processing or multiple server(s) 1520 may combine to perform the speech processing. Further, the server(s) 1520 may be configured to execute certain commands, such as answering queries spoken by the user 1506. In addition, certain speech detection or command execution functions may be performed by the device 1502.

As shown in FIG. 15, a system may receive (1530) audio data corresponding to a query. The system may then perform (1532) ASR on the audio data to determine query text. The system may then send (1534) the query text to NLU domains corresponding to built-in functionality of the system 1500. Those domains may then perform NLU processing to obtain N-best lists (one for each built-in domain). The system may also identify (1536) a plurality of intent categories corresponding to the query text along with scores for how the query text matches each intent category. The system may then identify (1538) a plurality of applications corresponding to the intent categories. The applications may correspond to supplemental applications created by third-party developers and added to the system 1500 to enhance the system functionality. The system may then send (1540) the query text to the NLU domains for each of the identified supplemental applications. Each domain for a supplemental application may then perform NLU processing to obtain N-best lists (one for each identified supplemental domain). The system may then merge and rank (1542) the N-best lists resulting from the NLU processing of the built-in domains and domains for the supplemental applications. The system may then send (1544) the top ranked result to a command processor 1590, which, for a result associated with a supplemental application, may be a supplemental application command processor 1590-X, which may be located separately from system 1500.

Figure 16:
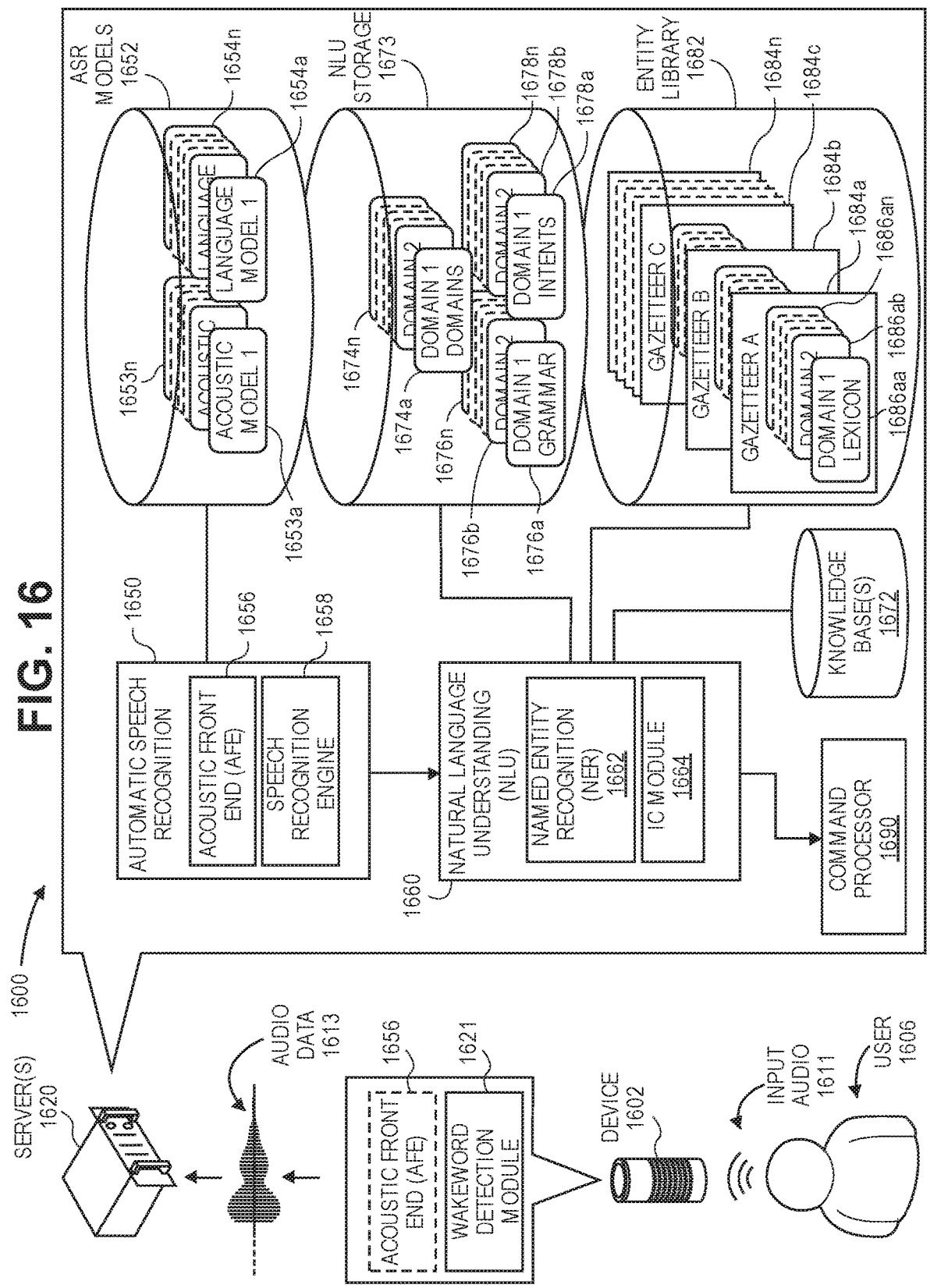
FIG. 16 illustrates example components of a speech processing system according to an implementation.

FIG. 16 is a conceptual diagram of how a spoken utterance is processed, allowing a system to capture and execute commands spoken by a user, such as spoken commands that may follow a wakeword. The various components illustrated may be located on the same or different physical devices. Communication between various components illustrated in FIG. 16 may occur directly or across a network. An audio capture component, such as a microphone of device 1602, captures audio 1611 corresponding to a spoken utterance from a user 1606. The device 1602, using a wakeword detection module 1621, then processes the audio, or audio data corresponding to the audio, to determine if a keyword (such as a wakeword) is detected in the audio. Following detection of a wakeword, the device sends audio data 1613 corresponding to the utterance, to a server 1620 that includes an ASR module 1650. The audio data 1613 may be output from an acoustic front end (AFE) 1656 located on the device 1602 prior to transmission. Or the audio data 1613 may be in a different form for processing by a remote AFE 1656, such as the AFE 1656 located with the ASR module 1650.

The wakeword detection module 1621 works in conjunction with other components of the device, for example, a microphone to detect keywords in the input audio 1611. For example, the device 1602 may convert input audio 1611 into audio data 1613, and process the audio data with the wakeword detection module 1621 to determine whether speech is detected, and, if so, if the audio data comprising speech matches an audio signature and/or model corresponding to a particular keyword.

The device 1602 may use various techniques to determine whether audio data includes speech. Some implementations may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 1602 may implement a limited classifier configured to distinguish speech from background noise. The classifier may be implemented by techniques such as linear classifiers, support vector machines, and decision trees. In still other implementations, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio 1611 received by the device 1602 (or separately from speech detection), the device 1602 may use the wakeword detection module 1621 to perform wakeword detection to determine when a user intends to speak a command to the device 1602. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 1621 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword and non-wakeword speech signal respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another implementation, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on, posterior threshold tuning or smoothing is applied for decision making. Other techniques for wakeword detection, such as those known in the art, may also be used.

Once the wakeword is detected, the local device 1602 may "wake" and begin transmitting audio data 1613 corresponding to input audio 1611 to the server(s) 1620 for speech processing. Audio data 1613 corresponding to the input audio 1611 may be sent to a server 1620 for routing to a recipient device or may be sent to the server for speech processing for interpretation of the included speech (e.g., for purposes of enabling communication sessions, for purposes of executing a command in the speech, or for other purposes). The audio data 1613 may include data corresponding to the wakeword, or the portion of the audio data corresponding to the wakeword may be removed by the local device 1602 prior to sending. Further, a local device 1602 may "wake" upon detection of speech/spoken audio above a threshold. Upon receipt by the server(s) 1620, an ASR module 1650 may convert the audio data 1613 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 1654*a*-1654*n* stored in an ASR model knowledge base (ASR Models Storage 1652). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1653*a*-1653*n* stored in an ASR Models Storage 1652), and the likelihood that a particular word which matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 1650 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1656 and a speech recognition engine 1658. The acoustic front end (AFE) 1656 transforms the audio data from the microphone into data for processing by the speech recognition engine. The speech recognition engine 1658 compares the speech recognition data with acoustic models 1653, language models 1654, and other data models and information for recognizing the speech conveyed in the audio data. The AFE may reduce noise in the audio data and divide the digitized audio data into frames representing time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1658 may process the output from the AFE 1656 with reference to information stored in speech/model storage (1652). Alternatively, post front-end processed data (such as feature vectors) may be received by the device executing ASR processing from another source besides the internal AFE. For example, the device 1602 may process audio data into feature vectors (for example using an on-device AFE 1656) and transmit that information to a server across a network for ASR processing. Feature vectors may arrive at the server encoded, in which case they may be decoded prior to processing by the processor executing the speech recognition engine 1658.

The speech recognition engine 1658 attempts to match received feature vectors to language phonemes and words as known in the stored acoustic models 1653 and language models 1654. The speech recognition engine 1658 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 1658 may use a number of techniques to match feature vectors to phonemes, for example using Hidden Markov Models (HMMs) to determine probabilities that feature vectors may match phonemes. Sounds received may be represented as paths between states of the MINI and multiple paths may represent multiple possible text matches for the same sound.

Following ASR processing, the ASR results may be sent by the speech recognition engine 1658 to other processing components, which may be local to the device performing ASR and/or distributed across the network(s). For example, ASR results in the form of a single textual representation of the speech, an N-best list including multiple hypotheses and respective scores, lattice, etc., may be sent to a server, such as server 1620, for natural language understanding (NLU) processing, such as conversion of the text into commands for execution, either by the device 1602, by the server 1620, or by another device (such as a server running a specific application like a search engine, etc.).

The device performing NLU processing 1660 (e.g., server 1620) may include various components, including potentially dedicated processor(s), memory, storage, etc. As shown in FIG. 16, an NLU component may include a named entity recognition (NER) module 1662 which is used to identify portions of query text that correspond to a named entity that may be recognizable by the system. A downstream process called named entity resolution actually links a text portion to an actual specific entity known to the system. To perform named entity resolution, the system may utilize gazetteer information (1684*a*, 1684*b*, 1684*c*-1684*n*) stored in entity library storage 1682. The gazetteer information may be used for entity resolution, for example matching ASR results with different entities (such as song titles, user names, etc.). Gazetteers may be linked to users (for example, a particular gazetteer may be associated with a specific user's list or collection of other user contacts), may be linked to certain domains (such as communication), or may be organized in a variety of other ways.

Generally, the NLU process takes textual input (such as processed from ASR 1650 based on the utterance input audio 1611) and attempts to make a semantic interpretation of the text. That is, the NLU process determines the meaning behind the text based on the individual words and then implements that meaning. NLU processing 1660 interprets a text string to derive an intent or a desired action from the user as well as the pertinent pieces of information in the text that allow a device (e.g., device 1602) or other service, such as the communication service, to complete that action. For example, if a spoken utterance is processed using ASR 1650 and outputs the text "Establish a communication session with Kim" the NLU process may determine that the user intended to initiate a communication session using a voice channel of the device 1602 with a contact matching the entity "Kim" (which may involve a downstream command processor 1690 linked with a communication session application).

The NLU may process several textual inputs related to the same utterance. For example, if the ASR 1650 outputs N text segments (as part of an N-best list), the NLU may process all N outputs to obtain NLU results.

The NLU process may be configured to parse and tag or otherwise annotate text as part of NLU processing. For example, for the text "Establish a communication session with Kim," "communication session" may be tagged as a command (to execute a communication session) and "Kim" may be tagged as a specific entity and target of the command (and a device identifier, such as a telephone number, for a device associated with the entity corresponding to "Kim" stored in a contact list may be included in the annotated result). Further, the NLU process may be used to provide answer data in response to queries, for example, using the knowledge base 1672.

To correctly perform NLU processing of speech input, an NLU process 1660 may be configured to determine a "domain" of the utterance so as to determine and narrow down which services offered by the endpoint device (e.g., server 1620 or device 1602) may be relevant. For example, an endpoint device may offer services relating to interactions with a communication service, a contact list service, a calendar/scheduling service, a music player service, etc. Words in a single text query may implicate more than one service, and some services may be functionally linked (e.g., both a communication service and a calendar service may utilize data from the contact list).

The named entity recognition (NER) module 1662 receives a query in the form of ASR results and attempts to identify relevant grammars and lexical information that may be used to construe meaning. To do so, the NER module 1662 may begin by identifying potential domains that may relate to the received query. The NLU storage 1673 includes a database of devices (1674a-1674n) identifying domains associated with specific devices. For example, the device 1602 may be associated with domains for music, communication sessions, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "communication session," "shopping," "music," "calendaring," etc. As such, each domain may be associated with a particular language model and/or grammar database (1676a, 1676b-1676n), a particular set of intents/actions (1678a, 1678b-1678n), and a particular personalized lexicon (1686). Each gazetteer (1684a-1684n) may include domain-indexed lexical information associated with a particular user and/or device. For example, the Gazetteer A (1684a) includes domain-index lexical information 1686aa, 1686ab-1686an. A user's music-domain lexical information might include album titles, artist names, and song names, for example, whereas a user's contact-list lexical information might include the names of contacts, identifiers for devices associated with those contacts, device characteristics, etc. Since every user's music collection and contact list is presumably different, this personalized information improves entity resolution.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (IC) module 1664 parses the query to determine an intent or intents for each identified domain, wherein the intent corresponds to the action to be performed that is responsive to the query. Each domain is associated with a particular set of intents/actions (1678a-1678n) of words linked to intents. For example, a music intent may link words and phrases such as "quiet," "volume off," and "mute" to a "mute" intent. The IC module 1664 identifies potential intents for each identified domain by comparing words in the query to the words and phrases in the set of intents actions 1678 for that domain. Traditionally, the determination of an intent by the IC module is performed using a set of rules or templates that are processed against the incoming text to identify a matching intent.

In order to generate a particular interpreted response, the NER 1662 applies the grammar models and lexical information associated with the respective domain to actually recognize and mention one or more entities in the text of the query. In this manner, the NER 1662 identifies "slots" (i.e., particular words in query text) that may be needed for later command processing. Depending on the complexity of the NER 1662, it may also label each slot with a type of varying levels of specificity (such as noun, place, city, artist name, song name, or the like). Each grammar model 1676 includes the names of entities (i.e., nouns) commonly found in speech about the particular domain (i.e., generic terms), whereas the lexical information 1686 from the gazetteer 1684 is personalized to the user(s) and/or the device. For instance, a grammar model associated with the communication session domain may include a database of words commonly used when people discuss communication sessions and/or constraints to include with communication sessions.

The intents identified by the IC module 1664 are linked to domain-specific grammar frameworks (included in 1676) with "slots" or "fields" to be filled. Each slot/field corresponds to a portion of the query text that the system believes corresponds to an entity. For example, if "establish a communication session" is an identified intent, a grammar (1676) framework or frameworks may correspond to sentence structures such as "Establish a communication session with {Contact Name}," "Call {Contact Name}," "Call {Device Identifier}," etc. However, to make resolution more flexible, these frameworks would ordinarily not be structured as sentences, but rather based on associating slots with grammatical tags.

For example, the NER module 1662 may parse the query to identify words as subject, object, verb, preposition, etc., based on grammar rules and/or models, prior to recognizing named entities. The identified verb may be used by the IC module 1664 to identify intent, which is then used by the NER module 1662 to identify frameworks. A framework for an intent of "call" may specify a list of slots/fields applicable to establish a communication session with the identified "object" and any object modifier (e.g., a prepositional phrase), such as {Contact Name}, {Device Identifier}, etc. The NER module 1662 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "Call Maddie's cell phone for five minutes" might be parsed and tagged as {Verb}: "Call," {Object}: "Maddie," {Object}: "cell phone," and {Object Modifier}: "five minutes." At this point in the process, "Call" is identified as a verb based on a word database associated with the communication session domain, which the IC module 1664 will determine corresponds to the "call" intent. At this stage, no determination has been made as to the meaning of "Maddie's," "cell phone," and "five minutes" but, based on grammar rules and models, it is determined that the text of these phrases relates to the grammatical objects (i.e., entity) of the query.

The frameworks linked to the intent are then used to determine what database fields should be searched to determine the meaning of these phrases, such as searching a user's gazetteer for similarity with the framework slots. So a framework for "call intent" might indicate to attempt to resolve the identified object based {Contact Name} or {Device Identifier} and another framework for the same intent might indicate to attempt to resolve the object modifier based on {Constraint}. If the search of the gazetteer does not resolve a slot/field using gazetteer information, the NER module 1662 may search the database of generic words associated with the domain (in the knowledge base 1672). So, for instance, if the query was "call Maddie on one of her devices," after failing to determine a device identifier of "one of her devices," the NER component 1662 may search the domain vocabulary or check generic words before the gazetteer information, or both may be tried, potentially producing two different results.

The results of NLU processing may be tagged to attribute meaning to the query. So, for instance, "Call Maddie on her cell phone for five minutes to discuss vacation plans" might produce a result of: {entity} Maddie, {intent} Call, {device identifier} "cell phone," {constraint 1} time duration, {condition 1} "five minutes," {constraint 2} subject, and {condition 2} "vacation plans."

The output from the NLU processing (which may include tagged text, commands, etc.) may then be sent to a command processor 1690, which may be located on a same or separate server 1620 as part of system 1600. The destination command processor 1690 may be determined based on the NLU output. For example, if the NLU output includes a command to establish a communication session, the destination command processor 1690 may be a communication application, such as one located on device 1602 or in another device associated with the user.

Figure 17:
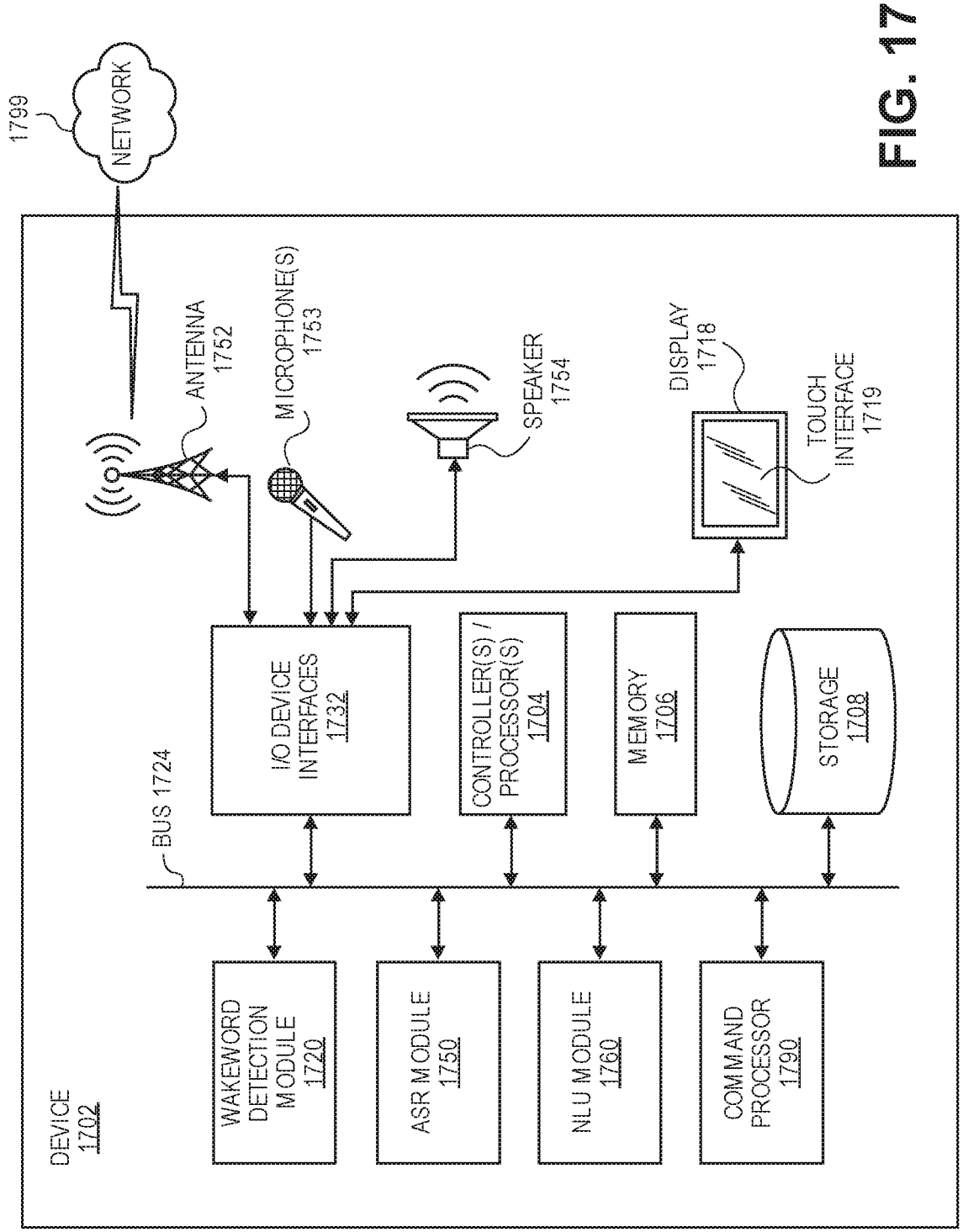
FIG. 17 illustrates example components of a speech-controlled device, according to an implementation.
Figure 18:
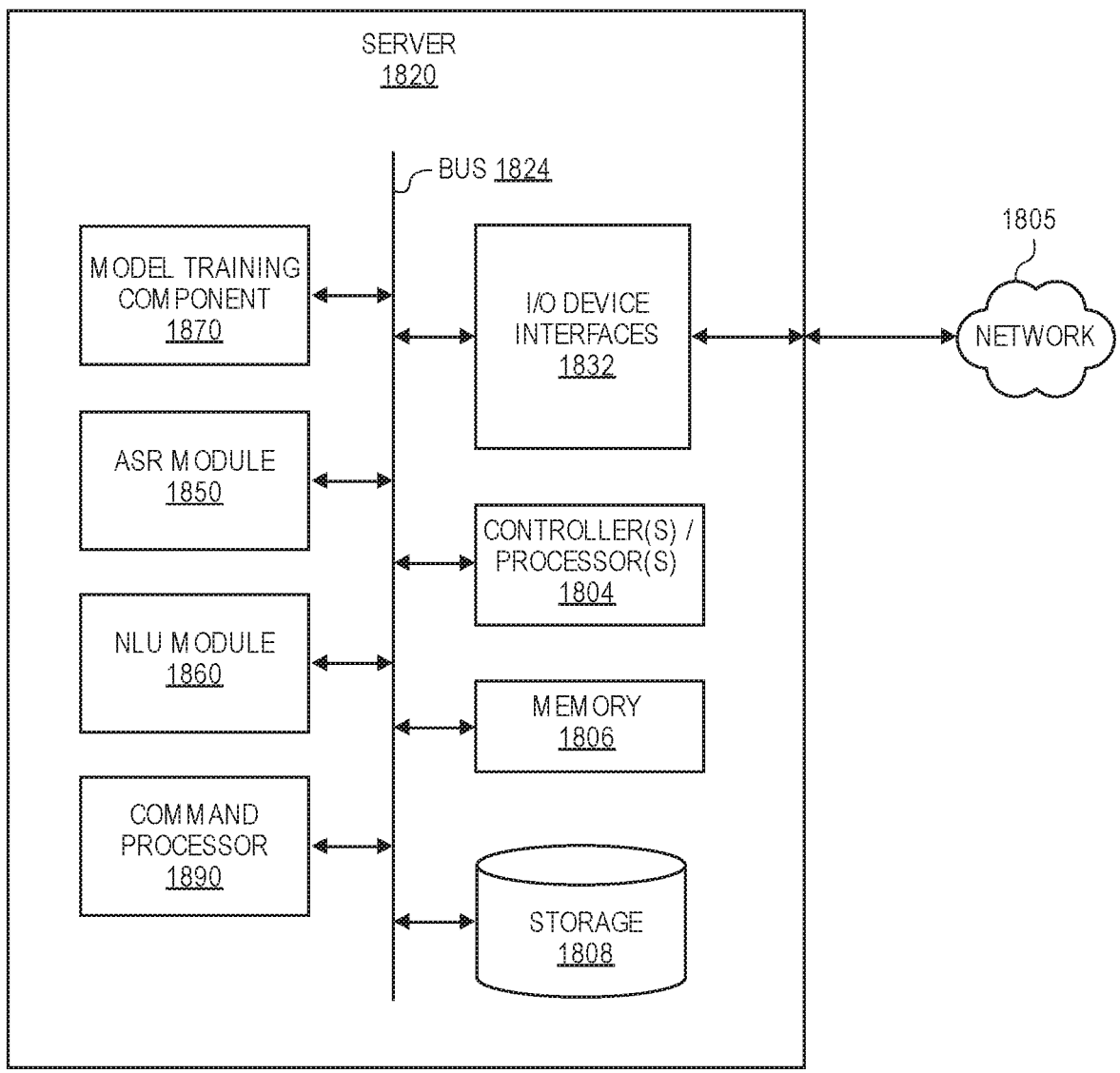
FIG. 18 illustrates example components of a server, according to an implementation.

FIG. 17 is a block diagram conceptually illustrating a local device 1702 that may be used with the described system. FIG. 18 is a block diagram conceptually illustrating example components of a remote device, such as a remote server 1820 that may assist with ASR, NLU processing, or command processing. Multiple such servers 1820 may be included in the system, such as one server(s) 1820 for training ASR models, one server(s) for performing ASR, one server(s) 1820 for performing NLU, etc. In operation, each of these devices (or groups of devices) may include computer-readable and computer-executable instructions that reside on the respective device (1702/1820), as will be discussed further below.

Each of these devices (1702/1820) may include one or more controllers/processors (1704/1804), that may each include a central processing unit (CPU) for processing data and computer-readable instructions, and a memory (1706/1806) for storing data and instructions of the respective device. The memories (1706/1806) may individually include volatile random access memory (RAM), non-volatile read only memory (ROM), non-volatile magnetoresistive (MRAM) and/or other types of memory. Each device may also include a data storage component (1708/1808), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1732/1832).

Computer instructions for operating each device (1702/1820) and its various components may be executed by the respective device's controller(s)/processor(s) (1704/1804), using the memory (1706/1806) as temporary "working" storage at runtime. A device's computer instructions may be stored in a non-transitory manner in non-volatile memory (1706/1806), storage (1708/1808), or an external device(s). Alternatively, some or all of the executable instructions may be embedded in hardware or firmware on the respective device in addition to or instead of software.

Each device (1702/1820) includes input/output device interfaces (1732/1832). A variety of components may be connected through the input/output device interfaces, as will be discussed further below. Additionally, each device (1702/1820) may include an address/data bus (1724/1824) for conveying data among components of the respective device. Each component within a device (1702/1820) may also be directly connected to other components in addition to (or instead of) being connected to other components across the bus (1724/1824).

Referring to the device 1702 of FIG. 17, the device 1702 may include a display 1718, which may comprise a touch interface 1719. Alternatively, the device 1702 may be "headless" and may primarily rely on spoken commands for input. As a way of indicating to a user that a connection between another device has been opened, relay constraint notification, etc., the device 1702 may be configured with a visual indicator, such as an LED or similar illumination element, that may change color, flash, or otherwise provide visual indications by the device 1702. The device 1702 may also include input/output device interfaces 1732 that connect to a variety of components such as an audio output component such as a speaker 1754, a wired headset or a wireless headset, and/or other components capable of outputting audio. The device 1702 may also include an audio capture component. The audio capture component may be, for example, a microphone 1753 or array of microphones, a wired headset or a wireless headset, etc. The microphone 1753 may be configured to capture audio, such as phrases or utterances from a user. If an array of microphones is included, approximate distance to a sound's point of origin may be determined using, for example, acoustic localization based on time and amplitude differences between sounds captured by different microphones of the array. The device 1702 (using microphone 1753, wakeword detection module 1720, ASR module 1750, etc.) may be configured to determine audio data corresponding to detected audio data. The device 1702 (using input/output device interfaces 1732, antenna 1752, etc.) may also be configured to transmit the audio data to server 1820 for further processing or to process the data using internal components such as a wakeword detection module 1720.

For example, via the antenna(s), the input/output device interfaces 1732 may connect to one or more networks 1799/1805 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, etc. A wired connection such as Ethernet may also be supported. Through the network(s) 1799/1805, the speech processing system may be distributed across a networked environment.

The device 1702 and/or server 1820 may include an ASR module (1750/1850). The ASR module 1750 in device 1702 may be of limited or extended capabilities or may not be included in the device 1702. The ASR module(s) may include the language models stored in the ASR model storage component, and perform the automatic speech recognition process. If limited speech recognition is included on the device 1702, the ASR module 1750 may be configured to identify a limited number of words, such as keywords detected by the device, whereas extended speech recognition may be configured to recognize a much larger range of words.

The device 1702 and/or server 1820 may include a limited or extended NLU module (1760/1860). The NLU module in device 1702 may be of limited or extended capabilities, or may not be included on the device 1702. The NLU module(s) may comprise the name entity recognition module, the intent classification module and/or other components, as discussed above. The NLU module(s) may also include a stored knowledge base and/or entity library, or those storages may be separately located.

The device 1702 and/or server 1820 may also include a command processor (1790/1890) that is configured to execute commands/functions associated with a spoken command as described above.

The device 1702 may include a wakeword detection module 1720, which may be a separate component or may be included in an ASR module 1750. The wakeword detection module 1720 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some implementations, the device 1702 may be configured collectively to identify a set of the directional audio signals in which the wake expression is detected or in which the wake expression is likely to have occurred.

The wakeword detection module 1720 receives captured audio and processes the audio to determine whether the audio corresponds to particular keywords recognizable by the device 1702 and/or system. The storage 1708 may store data relating to keywords and functions to enable the wakeword detection module 1720 to perform the algorithms and methods described above. The locally stored speech models may be pre-configured based on known information, prior to the device 1702 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 1702 prior to the user device 1702 being delivered to the user or configured to access the network by the user. The wakeword detection module 1720 may access the storage 1708 and compare the captured audio to the stored models and audio sequences using audio comparison, pattern recognition, keyword spotting, audio signature, and/or other audio processing techniques.

The server may include a model training component 1870. The model training component may be used to train the classifier(s)/models discussed above.

As noted above, multiple devices may be employed in a single speech processing system. In such a multi-device system, each of the devices may include different components for performing different aspects of the speech processing. The multiple devices may include overlapping components. The components of the devices 1702 and server 1820, as illustrated in FIGS. 17 and 18, are exemplary, and may be located as a stand-alone device or may be included, in whole or in part, as a component of a larger device or system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   receiving, at a communication service and from a first device associated with a first user, a communication request, wherein the communication service is remote from the first device;
   processing, at the communication service, the communication request to determine at least:
   a second device associated with a second user to be included in a communication session with the first device, wherein the communication service is remote from the second device; and
   a constraint for the communication session, the constraint indicating a time duration for the communication session;
   sending, from the communication service, an invitation to the second device, the invitation including an indication of a source of the communication request and an indication of the constraint;
   causing, with the communication service, a communication session between the first device and the second device to be established;
   sending, from the communication service and to at least one of the first device, the second device, or a third device that is different than the first device and the second device and not included in the communication session, a notification corresponding to the constraint indicating an amount of time remaining in the communication session between the first device and the second device;
   determining, at the communication service, that a duration of the communication session satisfies the time duration; and
   in response to determining that the time duration has been satisfied, terminating, by the communication service, the communication session between the first device and the second device.

2. The computer-implemented method of claim 1, further comprising:
   receiving, from at least one of the first device, the second device, or the third device, and during the communication session, a constraint modification request, the constraint modification request indicating a second time duration for the communication session;
   determining, based at least in part on a source of the constraint modification request, that the constraint is to be modified; and
   modifying the constraint based at least in part on the second time duration.

3. The computer-implemented method of claim 2, wherein modifying the constraint includes one or more of:
   adding the second time duration to the time duration;
   deducting the second time duration from the time duration;
   replacing the time duration with the second time duration; or
   adding a difference between the time duration and the second time duration to the time duration.

4. The computer-implemented method of claim 1, further comprising:
   receiving, during the communication session, a constraint modification request, the constraint modification request indicating a second time duration for the communication session;
   determining, based at least in part on a source of the constraint modification request, that the constraint modification request was not received from a device associated with a constraint owner;
   sending to the device associated with the constraint owner, the constraint modification request;
   receiving from the device associated with the constraint owner, a constraint modification request acceptance; and
   modifying the constraint to include the second time duration.

5. A computing system, comprising:
   one or more processors;
   a memory coupled to the one or more processors and storing program instructions that when executed by the one or more processors cause the one or more processors to at least:
   receive, at a communication service and from a first device associated with a first user, a communication request for a communication session and a constraint for the communication session, the constraint indicating a time duration for the communication session, wherein the communication service is remote from the first device;
   send, from the communication service, an invitation to a second device associated with a second user, the invitation including an indication of a source of the communication request and an indication of the constraint, wherein the communication service is remote from the second device;
   cause, with the communication service, the communication session to be established between the first device and the second device;
   determine, at the communication service, that a condition related to the constraint has been satisfied;
   send, from the communication service and to at least one of the first device, the second device, or a third device that is different than the first device and the second device and not included in the communication session, a notification corresponding to the constraint;
   determine, at the communication service, that a duration of the communication session satisfies the time duration; and in response to the determination that the duration has been satisfied, terminating, by the communication service, the communication session between the first device and the second device.

6. The computing system of claim 5, wherein the notification causes the first device, the second device, or the third device to generate an output corresponding to the notification.

7. The computing system of claim 5, wherein the program instructions further cause the one or more processors to at least:
cause a post communication action to be performed.

8. The computing system of claim 7, wherein the post communication action is at least one of establishing a second communication session, sending a text message, sending a voice message, sending a video message, creating a meeting request, receiving a text message, receiving a voice message, receiving a video message, storing a text message, storing a voice message, storing a video message, storing a recording of the communication session, generating an action, purchasing an item, calendaring an event, incrementing a communication session count, or sending content to a third device.

9. The computing system of claim 5, wherein the program instructions further cause the one or more processors to at least:
determine, at the communication service, a message to include in the notification sent to at least one of the first device or the second device, wherein the message is determined based at least in part on one or more of the communication session, a user input, a user profile, or a post communication action.

10. The computing system of claim 5, wherein the program instructions further cause the one or more processors to at least:
send, during the communication session and from the communication service, a second notification corresponding to the constraint to at least one of the first device or the second device.

11. The computing system of claim 5, wherein the program instructions further cause the one or more processors to at least:
send, during the communication session and from the communication service, a second notification indicating that the constraint may be modified during the communication session.

12. The computing system of claim 5, wherein the communication request is determined based at least in part on verbal information received by the first device.

13. The computing system of claim 5, wherein the program instructions that cause the one or more processors to send to at least one of the first device, the second device, or the third device, the notification, further cause the one or more processors to at least:
send, from the communication service and to the first device, a first notification corresponding to the constraint; and
send, from the communication service and to the second device, a second notification corresponding to the constraint, wherein the second notification is different than the first notification.

14. The computing system of claim 5, wherein the program instructions further cause the one or more processors to at least:
subsequent to the communication session being established, send, from the communication service and to at least one of the first device, the second device, or the third device, an initial notification indicating the constraint monitored for the communication session.

15. A computer-implemented method, comprising:
receiving, at a communication service and from a first device, a communication request for a communication session;
sending, from the communication service, an invitation to a second device that is different than the first device, the invitation indicating a source of the communication request, wherein the communication service is remote from the second device;
receiving, at the communication service and from the second device an acceptance and a constraint for the communication session, the constraint indicating at least a duration for the communication session;
causing, with the communication service, the communication session to be established between the first device and the second device;
sending, from the communication service and to at least one of the first device, the second device or a third device that is different than the first device and the second device and not included in the communication session, a notification indicating an amount of the duration remaining in the communication session before a condition related to the constraint is satisfied;
determining, at the communication service, that the condition has been satisfied; and
in response to determining that the condition has been satisfied, terminating, by the communication service, the communication session.

16. The computer-implemented method of claim 15, further comprising:
determining, by the communication service, the second device based at least in part on one or more of a user name indicated in the communication request, a device identifier included in the communication request, or a location of a user.

17. The computer-implemented method of claim 15, wherein the condition is at least one of an amount of time, a subject of the communication session, a location, a time of day, a day of week, or a status of a user.

18. The computer-implemented method of claim 15, further comprising:
in response to receiving, at the communication service, the acceptance and the constraint:
sending, from the communication service and to the first device, an indication of the constraint; and
receiving, at the communication service and from the first device, an acceptance of the constraint.

19. The computer-implemented method of claim 15, further comprising:
receiving, at the communication service and from the second device, a second constraint for the communication session, the second constraint indicating at least one of a first location constraint for the first device, a second location constraint for the second device, a fee for the communication session, a subject for the communication session, a third device to be included in the communication session, a time of day for the communication session, or a communication mode for the communication session.

20. The computer-implemented method of claim 15, wherein:
receiving, at the communication service and from the first device further includes receiving an initial constraint;
the invitation includes an indication of the initial constraint; and the constraint received at the communication service and from the second device is different than the initial constraint.

21. The computer-implemented method of claim 15, further comprising:
   determining, at the communication service, a fourth device associated with a constraint owner, the constraint owner authorized to modify the constraint; and
   including in a second notification corresponding to the constraint sent by the communication service and to the fourth device associated with the constraint owner an indication of an option to modify the constraint.

22. The computer-implemented method of claim 15, further comprising:
   subsequent to terminating the communication session, receiving, at the communication service and from the second device, an additional communication; and
   sending, from the communication service and to the first device, the additional communication.

23. The computer-implemented method of claim 22, wherein the additional communication is at least one of a video message, an audio message, or a digital item.

* * * * *